US012257792B2

(12) United States Patent
Guillot et al.

(10) Patent No.: US 12,257,792 B2
(45) Date of Patent: Mar. 25, 2025

(54) OPTICAL ARTICLES HAVING EMBOSSED FILMS DEFINING ENCAPSULATED MICROLENSES AND METHODS OF MAKING THE SAME

(71) Applicant: Essilor International, Charenton-le-Pont (FR)

(72) Inventors: Matthieu Guillot, Charenton-le-Pont (FR); Mathieu Meynen, Charenton-le-Pont (FR); Hao-Wen Chiu, Charenton-le-Pont (FR); Christophe Plessis, Charenton-le-Pont (FR); Jeanne Marchal, Charenton-le-Pont (FR); Bjorn Drobe, Singapore (SG)

(73) Assignee: Essilor International, Charenton-le-Pont (FR)

( * ) Notice: Subject to any disclaimer, the term of this patent is extended or adjusted under 35 U.S.C. 154(b) by 901 days.

(21) Appl. No.: 17/286,244

(22) PCT Filed: Sep. 27, 2019

(86) PCT No.: PCT/EP2019/076176
§ 371 (c)(1),
(2) Date: Apr. 16, 2021

(87) PCT Pub. No.: WO2020/078693
PCT Pub. Date: Apr. 23, 2020

(65) Prior Publication Data
US 2021/0354409 A1  Nov. 18, 2021

(30) Foreign Application Priority Data
Oct. 17, 2018 (EP) .................................... 18306360

(51) Int. Cl.
*B29D 11/00* (2006.01)
*B29C 59/02* (2006.01)
*G02B 3/00* (2006.01)

(52) U.S. Cl.
CPC .. *B29D 11/00028* (2013.01); *B29D 11/00355* (2013.01); *B29D 11/00788* (2013.01); *G02B 3/0031* (2013.01); *B29C 2059/023* (2013.01)

(58) Field of Classification Search
CPC ........ B29D 11/00028; B29D 11/00355; B29D 11/00788; G02B 3/0031; B29C 2059/023
(Continued)

(56) References Cited

U.S. PATENT DOCUMENTS

| 6,104,536 A | 8/2000 | Eckhardt |
| 2009/0148696 A1* | 6/2009 | Ogawa ..................... C09D 4/00 428/335 |

(Continued)

FOREIGN PATENT DOCUMENTS

| EP | 1887414 B1 | 12/2013 |
| EP | 3273292 | 1/2018 |

(Continued)

OTHER PUBLICATIONS

EP-3273292—English translation—Jan. 2018—GLERG—B29D11/00028.*

(Continued)

*Primary Examiner* — Sharrief I Broome
(74) *Attorney, Agent, or Firm* — Norton Rose Fulbright US LLP

(57) ABSTRACT

The present disclosure includes optical articles comprising a film layer that has first and second film surfaces and is embossed such that the first film surface defines a plurality of concave optical elements and the second film surface defines a plurality of convex optical elements. The present (Continued)

optical articles can include one or more optical layers coupled to the film layer. Each of the optical layer(s) can encapsulate the concave optical elements or the convex optical elements.

14 Claims, 15 Drawing Sheets

(58) Field of Classification Search
    USPC ........................................................ 359/642
    See application file for complete search history.

(56) References Cited

U.S. PATENT DOCUMENTS

| | | | | |
|---|---|---|---|---|
| 2009/0161066 A1* | 6/2009 | Blum | ..................... | G02C 7/061 |
| | | | | 351/159.42 |
| 2014/0347581 A1* | 11/2014 | Haddock | ................ | G02C 7/022 |
| | | | | 349/149 |
| 2015/0309332 A1 | 10/2015 | Hillenbrand et al. | | |
| 2016/0091737 A1* | 3/2016 | Kim | ......................... | G02C 7/04 |
| | | | | 156/60 |
| 2016/0306192 A1* | 10/2016 | Marshall | ................. | G02C 7/06 |
| 2017/0131567 A1 | 5/2017 | To | | |
| 2017/0139230 A1 | 5/2017 | Ambler | | |
| 2017/0184875 A1* | 6/2017 | Newman | ................ | G02C 7/022 |

FOREIGN PATENT DOCUMENTS

| | | | | |
|---|---|---|---|---|
| EP | | 3273292 A1 * | 1/2018 | ....... B29D 11/00028 |
| WO | WO 2018/076057 | | 5/2018 | |
| WO | WO-2018076057 A1 * | | 5/2018 | ......... G02B 27/4205 |
| WO | WO 2020/078691 | | 4/2020 | |

OTHER PUBLICATIONS

International Search Report and Written Opinion issued in International Application No. PCT/EP2019/076176 mailed on Dec. 2, 2019.

International Search Report and Written Opinion issued in International Application No. PCT/EP2019/076172 mailed on Dec. 2, 2019.

Office Action issued in corresponding European Application No. 18306360.1, mailed Oct. 10, 2024.

Zeiss et al., "Oberflachenbeschaffenheit", (Dec. 23, 2018), XP093209848, Retrieved from the Internet: URL:https://pages.zeiss.com/rs/896-XMS-794/images/DE_60_050_0041_0berflaeche_A0.pdf.

* cited by examiner

OPTICAL ARTICLES HAVING EMBOSSED FILMS DEFINING ENCAPSULATED MICROLENSES AND METHODS OF MAKING THE SAME

CROSS-REFERENCE TO RELATED APPLICATIONS

This application is a national phase application under 35 U.S.C. § 371 of International Application No. PCT/EP2019/076176 filed 27 Sep. 2019, which claims priority to European Patent Application No. 18306360.1 filed 17 Oct. 2018. The entire contents of each of the above-referenced disclosures is specifically incorporated by reference herein without disclaimer.

FIELD OF INVENTION

The present invention relates generally to optical articles and, particularly but without limitation, to optical articles comprising encapsulated optical elements defined by an embossed film.

BACKGROUND

Optical articles, such as lenses, can be used to correct refractive errors of the eye, such as, for example, myopia, hyperopia, presbyopia, and astigmatism. Some lenses include optical elements such as microlenses on the lens surface which can facilitate correction of these refractive errors. For example, microlenses can provide a positive addition value to focus part of the incoming light in front of the retina and thereby control myopia evolution.

Microlenses are used in other applications as well. For example, microlenses are used in digital projectors, imaging devices, e.g., photocopiers and mobile-phone cameras, microscopes, e.g., for uniform illumination, displays, and for improving light collection efficiency of CCD arrays, among other applications.

Optical elements disposed on an outer lens surface may have limited protection and thus can be susceptible to damage. Some lenses include a coating, such as a hard coat or varnish, on the optical elements. These coatings, however, may not provide adequate protection. Additionally, these conventional coatings can change the geometric shape and thus the optical design of the optical elements. As a result, the optical elements may no longer provide the optical target they were designed to meet. Accordingly, there is a need in the art for optical articles configured to provide adequate optical element protection without altering the optical design thereof.

SUMMARY

The present optical articles address the need for improved optical element protection by providing an embossed film that defines optical elements encapsulated by one or more optical layers. An optical article according to the invention is defined in claim 1. The embossed film can define a plurality of concave optical elements, e.g., microlenses, on a first film surface and a plurality of convex optical elements, e.g., microlenses, on a second film surface. A primary optical layer can be coupled to the first film surface to fully encapsulate the concave optical elements and/or a secondary optical layer can be coupled to the second film surface to fully encapsulate the convex optical elements. The optical layer(s) can protect the optical elements with little, if any, alterations to the optical design thereof.

Some of the present optical articles comprise a film layer having opposing first and second film surfaces. The film layer, in some articles, can be embossed such that the first film surface defines a plurality of concave optical elements, e.g., microlenses. In some articles, the film layer can be embossed such that the second film surface defines a plurality of convex optical elements, e.g., microlenses. Each of the convex and concave optical elements, in some articles, has a diameter that is less than or equal to 2.0 millimeters (mm). In some articles, each of the convex and concave optical elements has a maximum height that is less than or equal to 0.1 mm. Optionally, the maximum height is measured in a direction perpendicular to the first film surface or to the second film surface.

Some articles comprise a primary optical layer having opposing first and second primary optical surfaces. The primary optical layer, in some articles, is coupled to the film layer such that the second primary optical surface is disposed on the first film surface. In some articles, for each of the concave optical elements, the primary optical layer occupies all of a volume defined by the concave optical element. In other articles, the primary optical layer is coupled to the film layer such that the second primary optical surface is disposed on the second film surface. In some of such articles, the primary optical layer has a maximum thickness, optionally measured in a direction perpendicular to the second film surface between the first and second primary optical surfaces, that is larger than the maximum height of each of the convex optical elements. In some of such articles, the convex optical elements are encapsulated within a volume defined between the first film surface and the first primary optical surface. Other embodiments of the optical article according to the invention are defined in claims 2-7.

Some of the present methods of forming an optical article comprise embossing a film having opposing first and second surfaces. A method of forming an optical article according to the invention is defined in claim 8. In some methods, the embossing is performed such that the second surface defines a plurality of convex optical elements and the first surface defines a plurality of concave optical elements. Each of the convex and concave optical elements, in some methods, has a diameter that is less than or equal to 2.0 mm. In some methods, each of the convex and concave optical elements has a height that is less than or equal to 0.1 mm, optionally measured in a direction perpendicular to the first surface or to the second surface.

Some methods comprise cutting the film to separate one or more film layers, each having opposing first and second film surfaces. In some methods, the cutting is performed such that the second film surface has a plurality of the convex optical elements and/or the first film surface has a plurality of the concave optical elements. Some methods comprise, for each of the film layer(s), coupling the film layer to a primary optical layer having opposing first and second primary optical surfaces. The coupling, in some methods, is performed such that the second primary optical surface is disposed on the first film surface. In some methods, for each of the concave optical elements, the primary optical layer occupies all of a volume defined by the concave optical element. Other embodiments of the method of forming an optical article according to the invention are defined in claims 9-14.

The term "coupled" is defined as connected, although not necessarily directly and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments. Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

DETAILED DESCRIPTION OF ILLUSTRATIVE EMBODIMENTS

Figure 1A:
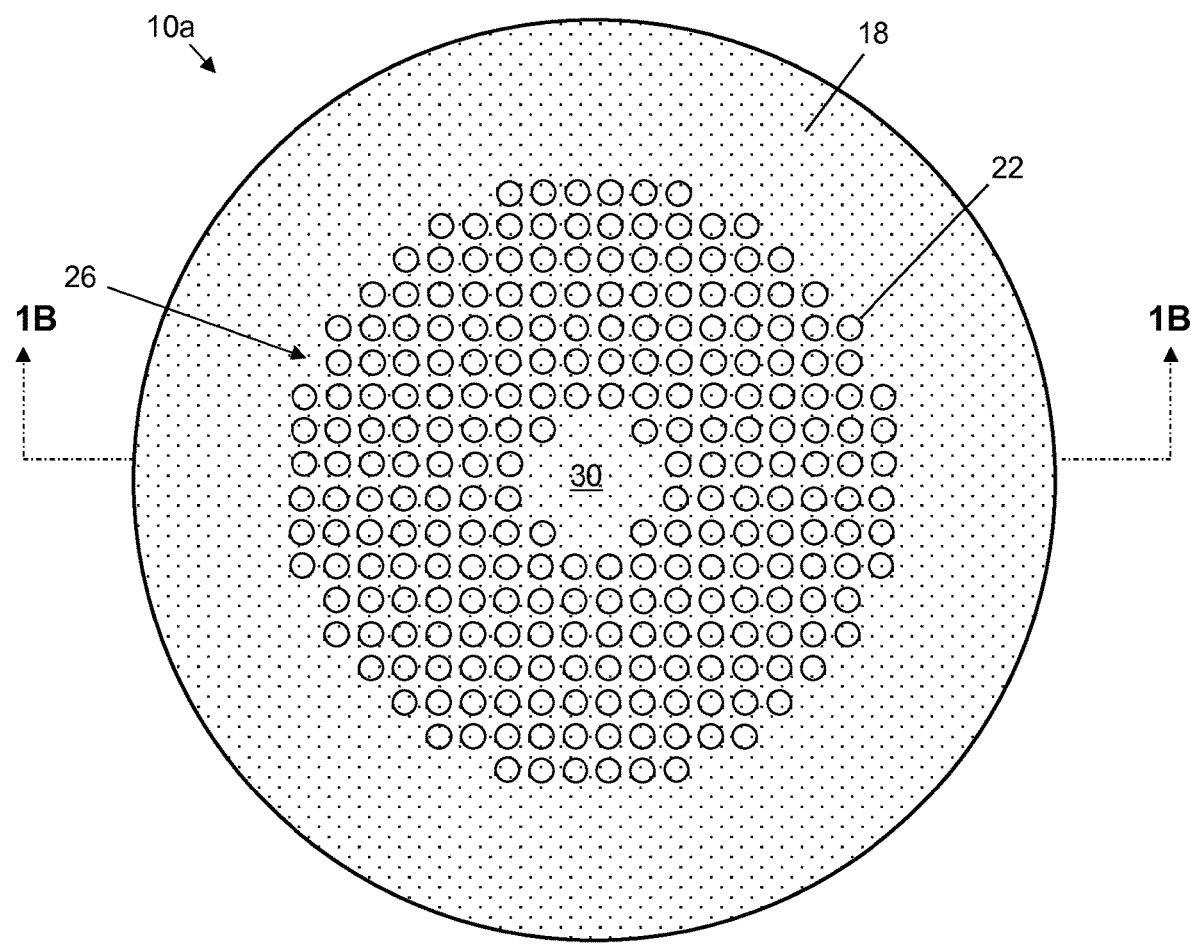
FIG. 1A is a top view of a first embodiment of the present optical articles that comprises an embossed film layer defining convex and concave optical elements and a primary optical layer coupled to the film layer to encapsulate the concave optical elements.
Figure 1B:
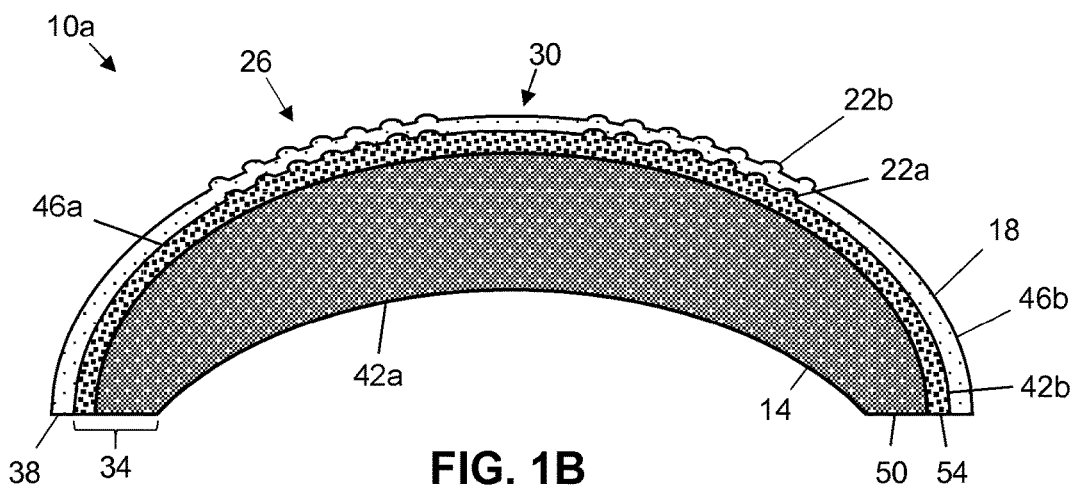
FIG. 1B is a sectional view of the optical article of FIG. 1A taken along line 1B-1B.
Figure 1C:
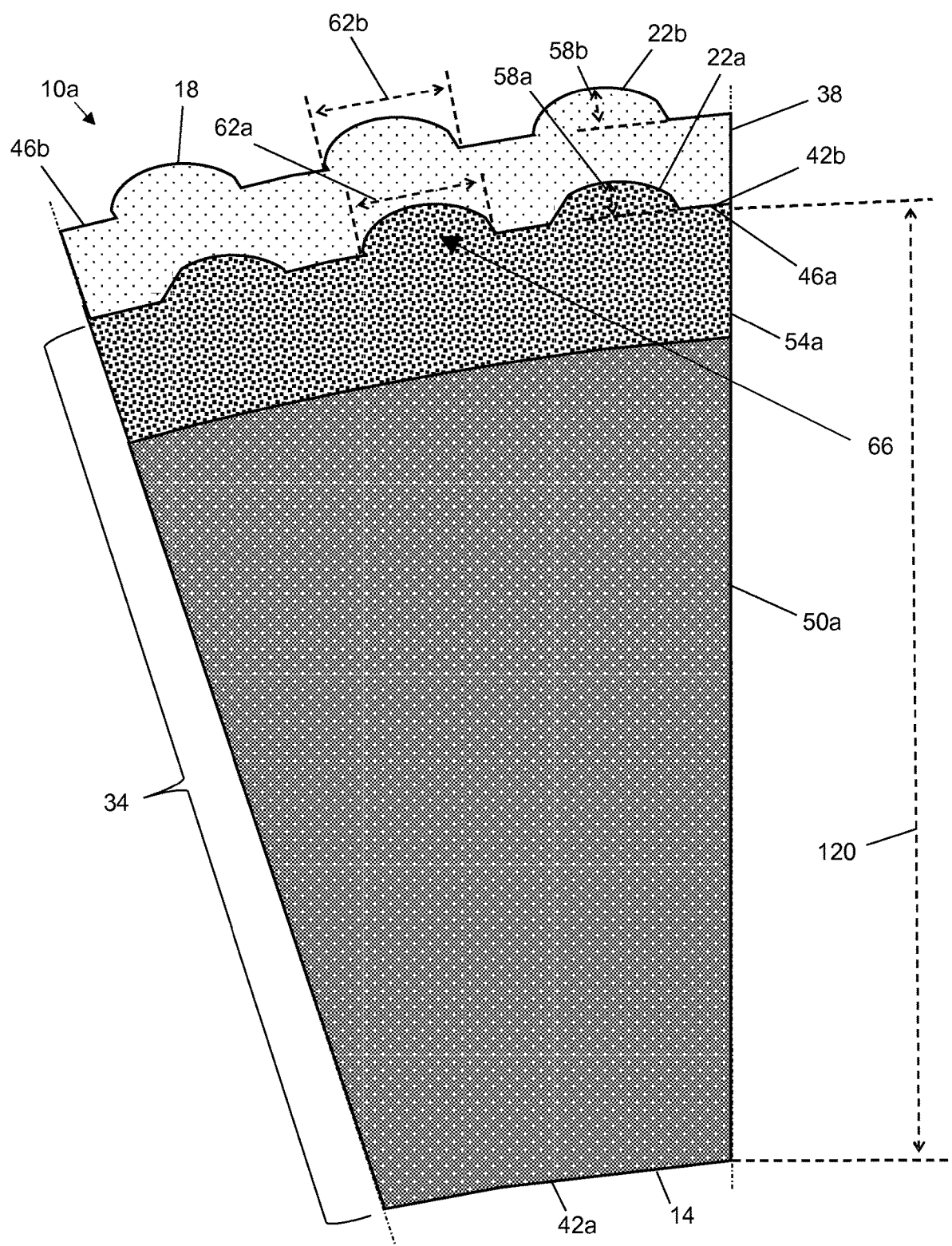
FIG. 1C is an enlarged, partial sectional view of the optical article of FIG. 1A.

Referring to FIGS. 1A-1C, shown is a first embodiment 10a of the present optical articles. Optical article 10a can comprise a primary optical layer 34 having opposing first and second primary optical surfaces 42a and 42b and a film layer 38 having opposing first and second film surfaces 46a and 46b. Optical article 10a can have any suitable shape; for example, the optical article can be spherical, toric, or aspherical. To illustrate, optical article 10a can have an inner surface 14, e.g., defined by first primary optical surface 42a, and an outer surface 18, e.g., defined by second film surface 46b. Inner surface 14 can be concave and outer surface 18 can be convex; in other embodiments, however, each of the inner and outer surfaces can be concave, convex, or planar, depending on the intended use for optical article 10a.

Film layer 38 can be embossed such that first film surface 46a defines a plurality of concave optical elements 22a and second film surface 46b defines a plurality of convex optical elements 22b. Each of concave and convex optical elements 22a and 22b can comprise any suitable optical element, e.g., for refracting light, such as, for example, a microlens, a Fresnel ring, and the like. As shown, each of concave and convex optical elements 22a and 22b is a microlens. At least a portion of a concave optical element, e.g., 22a, can define a concave surface and/or the concave optical element can have one or more portions that are recessed in the film. At least a portion of a convex optical element, e.g., 22b, can define a convex surface and/or the convex optical element can have one or more portions that project outwardly from the film.

Concave and convex optical elements 22a and 22b can be arranged in any suitable manner. For example, concave and convex optical elements 22a and 22b can be defined within a first area 26 that spans across all or part of film layer 38 and, optionally, the film layer can have one or more second areas 30 having no optical elements, e.g., in an area surrounded by first area 26 and/or at the periphery of optical article 10a. Each of concave and convex optical elements 22a and 22b can have a maximum height 58a and 58b, e.g., measured in a direction perpendicular to first film surface 46a or second film surface 46b, that is less than or equal to 0.1 millimeters (mm), such as, for example, less than or equal to or between any two of 100 micrometers (μm), 90 μm, 80 μm, 70 μm, 60 μm, 50 μm, 40 μm, 30 μm, 20 μm, 10 μm, 5 μm, 1 μm, or smaller. Each of concave and convex optical elements 22a and 22b can have a diameter 58a and 58b, respectively, that is less than or equal to 2.0 mm, such as, for example, less than or equal to or between any two of 2.0 mm, 1.5 mm, 1.0 mm, 0.5 mm, 0.1 mm, 80 μm, 60 μm, 40 μm, 20 μm, or smaller. And, without limitation, primary optical layer 34 can have a minimum thickness 120, measured between first and second primary optical surfaces 42a and 42b, e.g., in a direction perpendicular to the second primary optical surface, than is greater than or equal to 1 mm, such as for example, greater than or equal to or between any two of, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, or larger.

Film layer 38 can be coupled to primary optical layer 34 such that second primary optical surface 42b is disposed on first film surface 46a. Primary optical layer 34 can fully encapsulate concave optical elements 22a. For example, for each of concave optical elements 22a, primary optical layer 34 can occupy all of a volume 66 defined by the optical element. Primary optical layer 34, by fully encapsulating concave optical elements 22a, can protect the concave optical elements with minimal, if any, alterations to the optical design of the optical elements. Primary optical layer 34 can thus promote improved optics in optical article 10a compared to conventional protective coatings, which can change the geometric shape and thus the optical design of the optical elements. As shown, convex optical elements 22b are not encapsulated; however, in other embodiments, the convex optical elements can be encapsulated, as described in further detail below and, in some of such embodiments, the concave optical elements can but need not be encapsulated as well.

Primary optical layer 34 can comprise a first optical member 50a and a first adhesive 54a. First adhesive 54a can define second primary optical surface 42b and can couple and/or adhere first optical member 50a to film layer 38. To maintain the optical design of concave optical elements 22a, first adhesive 54a can fully encapsulate each of the concave optical elements, e.g., can occupy all of volume 66 define by the concave optical element. First adhesive 54a can be any optically suitable adhesive, such as, for example, an adhesive capable of conveying visible and/or ultraviolet light therethrough, e.g., a UV adhesive. Additionally, or alternatively, first adhesive 54a can comprise one or more coatings. At least one, optional each, of the coating(s) can comprise a polyurethane coating, a scratch-resistant coating, an anti-glare coating, an antireflective coating, a photochromic coating, an anti-smudge coating, an anti-fog coating, a tintable coating, a self-healing coating, an anti-rain coating, an anti-static coating, an anti-UV coating, or an anti-blue light coating. First optical member 50a can comprise a lens or a wafer. Suitable materials for first optical member 50a can include any optical material such as, for example, polycarbonate, co-polyester, thermoplastic polyurethane, poly(methyl methacrylate), polyamide, bio-engineered polymers, cellulose triacetate, allyl diglycol carbonate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and the like. Film layer 38 can comprise a polymer.

The addition value of concave optical elements 22a can depend at least in part on the materials used in primary optical layer 34, e.g., in first optical member 50a and first adhesive 54a. For example, first optical member 50a and first adhesive 54a can have different indices of refraction to achieve an appropriate optical element addition value. The difference between the indices of refraction of first adhesive 54a and first optical member 50a can be greater than or equal to 0.10, such as, for example, greater than or equal to or between any two of 0.10, 0.15, 0.20, 0.25, 0.30, 0.35, 0.40, 0.45, 0.50, or more. First adhesive 54a can have an index of refraction that is greater than or less than that of first optical member 50a, depending, e.g., on whether a positive addition value, e.g., to control myopia, or a negative addition value, e.g., to control hyperopia, is desired.

Figure 2A:
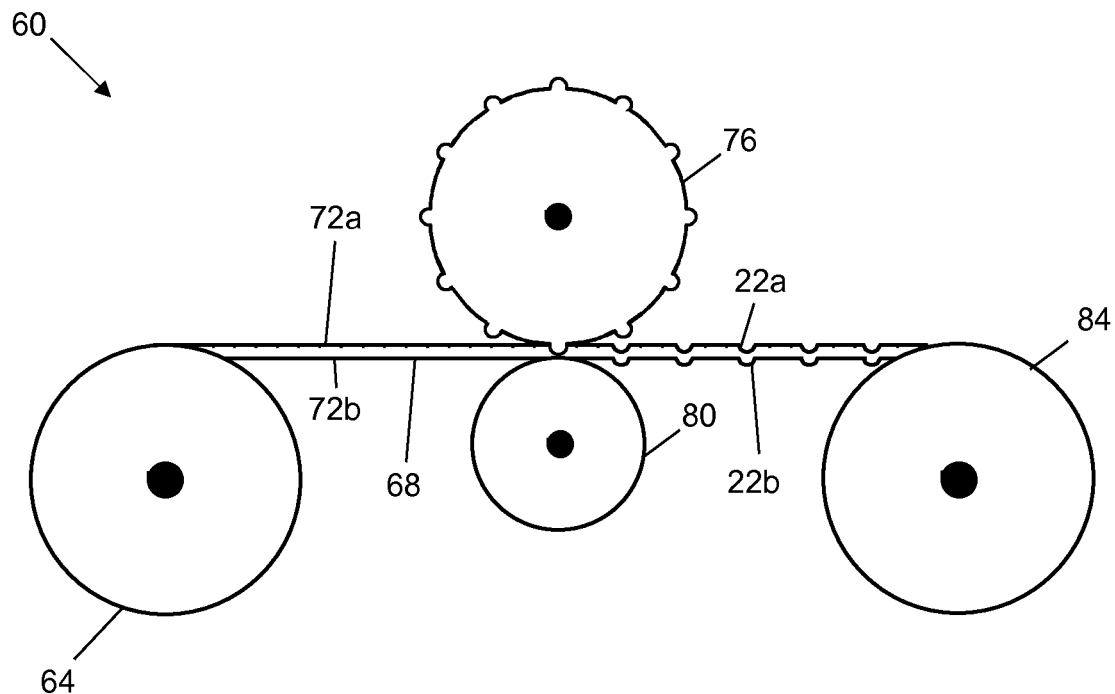
FIGS. 2A and 2B schematically illustrate a system suitable for use in some of the present methods to emboss and cut a film to manufacture one or more film layer(s) for an optical article.
Figure 2B:
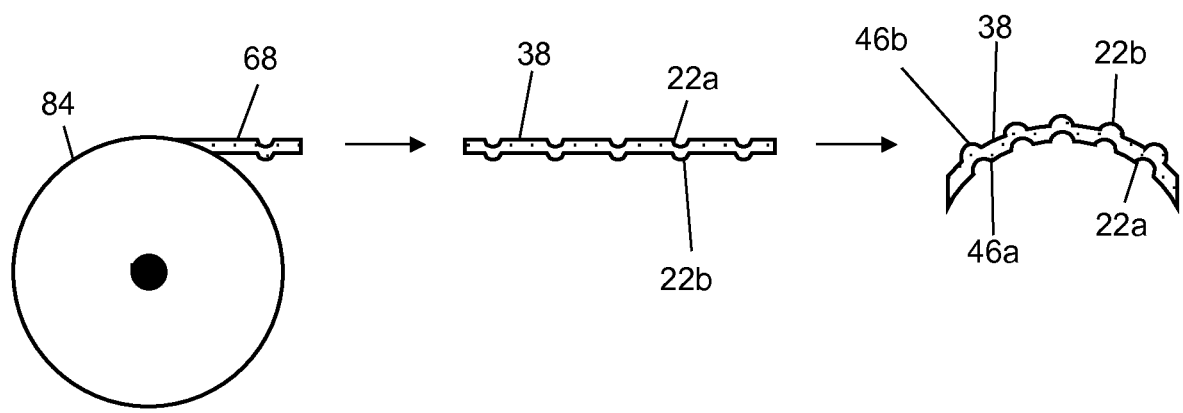

Referring to FIGS. 2A and 2B, shown is a system 60 suitable for use in some of the present methods to form an embossed film layer, e.g., 38, that defines concave and convex optical elements, e.g., 22a and 22b, and that can be incorporated in some of the present optical articles, e.g., 10a-10g. While some of the present methods are described with reference to system 60, system 60 is not limiting on those methods, which can be performed using any suitable system.

Some of the present methods for forming an optical article, e.g., 10a-10g, can comprise embossing a film, e.g., 68, having first and second surfaces, e.g., 72a and 72b. The embossing can be performed such that the first surface defines a plurality of concave optical elements, e.g., 22a, and the second surface defines a plurality of convex optical elements, e.g., 22b, each sized and shaped as described above with reference to optical article 10a. Embossing can be performed in any suitable manner, such as, for example, using a roll-to-roll process (FIG. 2A). In some methods, the film can be unrolled from an unwinding roll, e.g., 64, and can be passed between a mold roll, e.g., 76, and a substrate roll, e.g., 80. The mold roll can be heated to heat the film and facilitate embossing. When the film passes between the mold and substrate rolls, an embossing element on the mold roll can create a concave optical element on the first surface of the film. The film, in some embodiments, can maintain its thickness during the embossing. As such, for each concave optical element formed by the mold roll, a corresponding convex optical element can be formed on the second surface of the film. The embossed film can be cooled as it moves away from the mold and substrate rolls, e.g., to maintain the geometry of the optical elements, and can be collected around a winding unit, e.g., 84.

Some of the present methods comprise cutting the film to separate one or more film layers, e.g., 38, for use in an optical article, e.g., 10a-10g, each of the film layer(s) having opposing first and second film surfaces, e.g., 46a and 46b. The first film surface can have a plurality of the concave optical elements and the second film surface can have a plurality of the convex optical elements. For example, the embossed film can be unrolled from the winding unit and cut to create one or more of the film layers (FIG. 2B). The cut film layer(s) can be shaped, e.g., via thermoforming, depending on the intended use of the optical article. For example, each of the film layer(s) can be shaped such that the first film surface is concave and the second film surface is convex; however, in other embodiments, each of the first and second film surfaces can be concave, convex, or planar.

Figure 2C:
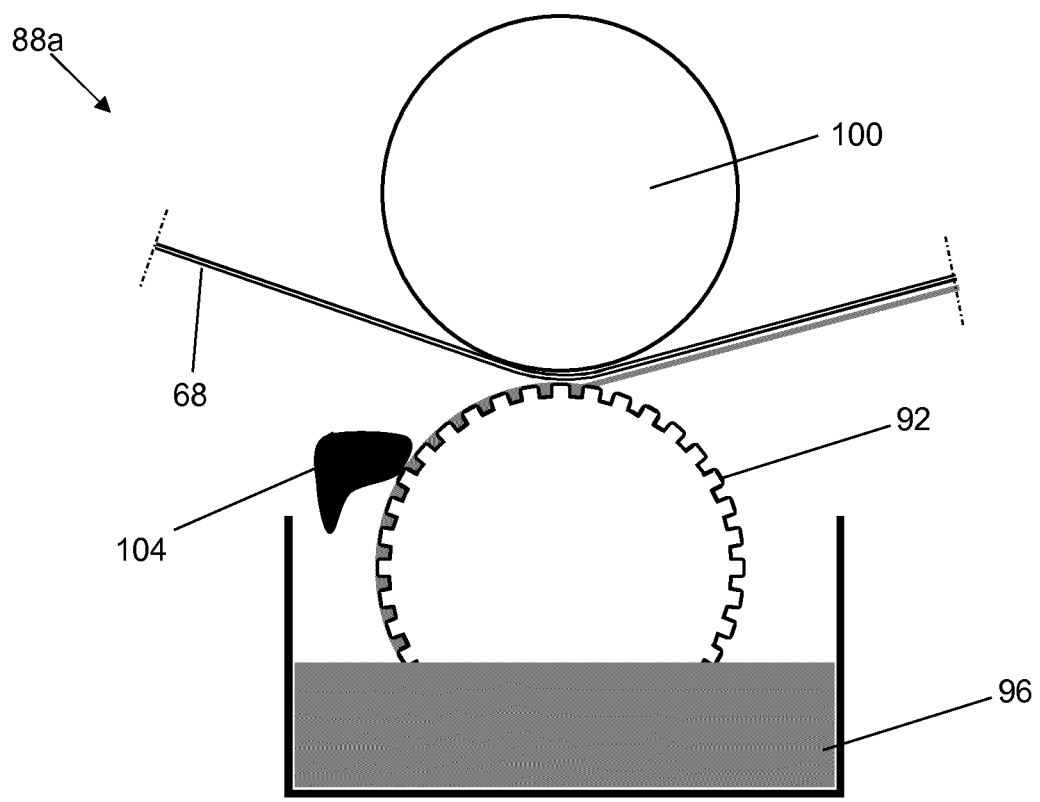
FIGS. 2C and 2D schematically illustrate a gravure coating system and a knife-over-roll coating system, respectively, suitable for applying a coating to the film.
Figure 2D:
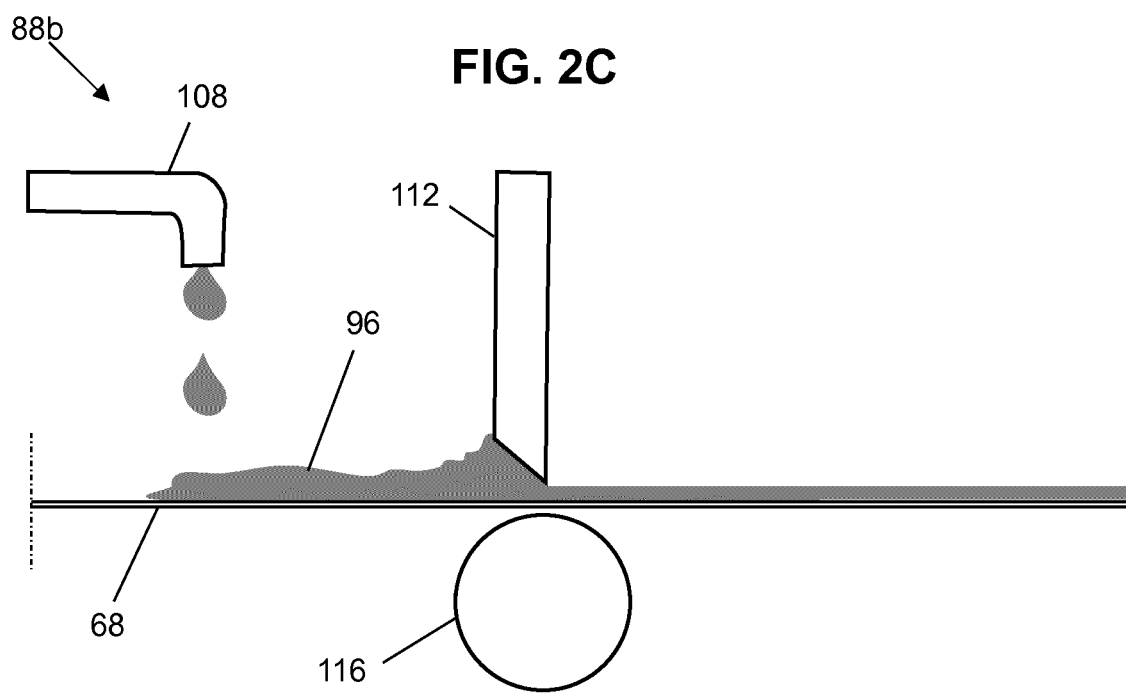

Referring to FIGS. 2C and 2D, some of the present methods optionally comprise applying one or more coatings, e.g., any of the above-described coatings, to the film, optionally before the embossing. The coating(s) can be applied in any suitable manner. For example, in some methods, one or more of the coating(s) can be applied with a gravure coating system, e.g., 88a (FIG. 2C). The gravure coating system can comprise an engraved roller, e.g. 92, having a plurality of engravings on its surface configured to lift the coating(s), e.g., 96, from a pool. The gravure coating system can comprise a doctor blade, e.g., 104, to, e.g., smoothen the coating(s) as they are lifted. The film can be passed between the engraved roller and a pressure roller, e.g., 100, to deposit the coating(s) on the film, e.g., on one of the first and second surfaces of the film, depending, for example, on which of the surfaces will define an outer surface of the optical article. Additionally or alternatively, one or more of the coating(s) can be applied with a knife-over-roll system, e.g., 88b (FIG. 2D). The knife-over-roll system can comprise an applicator, e.g., 108, that, during the coating process, deposits, e.g., via droplets, the coating(s) onto the film. The film, with the coating(s) disposed thereon, can be passed between a smoothing knife, e.g., 112, and a guide roll, e.g., 116. The smoothing knife can smoothen the coating(s) to promote an even application of the coating(s). The film can be embossed, e.g., as described above, after the coating. Application of the coating(s) before the embossing can facilitate an easier manufacturing process and mitigate the risk of optical element damage that could otherwise occur when the coating is applied.

To form one of the present optical articles, e.g., 10a-10g, some methods comprise, for each of the film layer(s), coupling the film layer to a primary optical layer, e.g., 34, having opposing first and second primary optical surfaces, e.g., 42a and 42b, respectively. The coupling can be performed such that the second primary optical surface is disposed on the first film surface to fully encapsulate each of the concave optical elements defined thereon, e.g., as described above in reference to optical article 10a. In other embodiments, however, the coupling can be performed such that the first primary optical surface is disposed on the second film surface to fully encapsulate each of the convex optical elements defined thereon, e.g., as described in further detail below with reference to secondary optical member 70.

The primary optical member, in some methods, comprises a first adhesive, e.g., 54a, disposed on a first optical member, e.g., 50a, e.g., as in optical article 10a. In some of such methods, coupling the primary optical layer can comprise applying the first adhesive to at least one of the first film surface and a surface of the first optical member. The first optical member can be adhered to the film layer with the first adhesive such that the first adhesive is disposed between the film layer and the first optical member and fully encapsulates the concave optical elements, e.g., as in optical article 10a. If the first adhesive comprises one or more coating(s), the coating(s) can be applied to the first film surface, e.g., to encapsulate the concave optical elements, and cured. After the curing, the first optical member can be formed and coupled to the cured coating(s) in a mold, e.g., as described in further detail below.

Figure 3A:
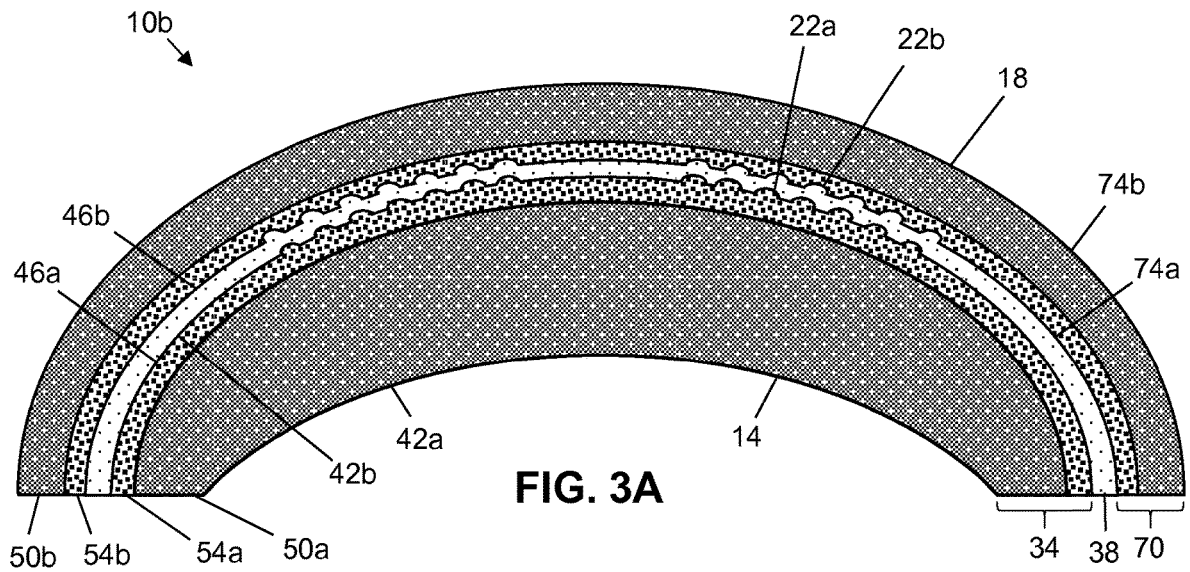
FIGS. 3A and 3B are sectional views of a second embodiment of the present optical articles having a secondary optical layer that encapsulates the convex optical elements.
Figure 3B:
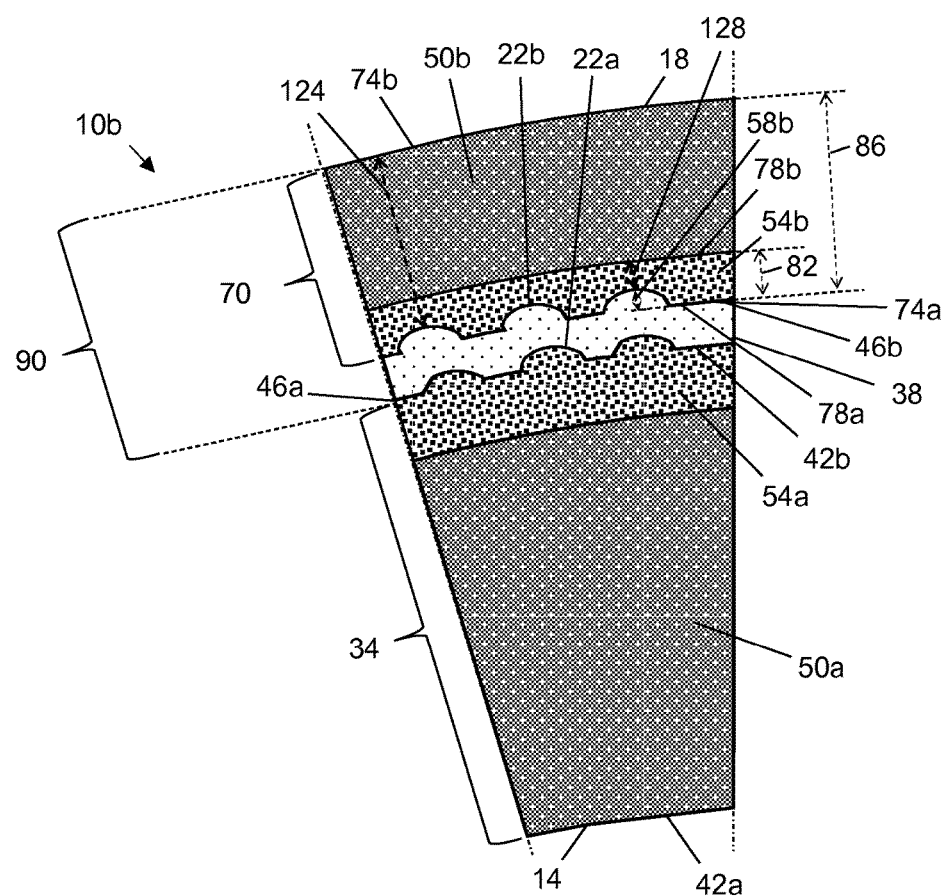

Referring to FIGS. 3A and 3B, shown is an optical article 10b that is substantially similar to optical article 10a, the primary exception being that optical article 10b also comprises a secondary optical layer 70. Secondary optical layer 70 can have first and second secondary optical surfaces 74a and 74b and can be coupled to film 38 such that the first secondary optical surface is disposed on second film surface 46b. Secondary optical layer 70 can fully encapsulate convex optical elements 22b. For example, secondary optical layer 70 can have a maximum thickness 86, e.g., measured in a direction perpendicular to first or second film surfaces 46a, 46b, that is larger than maximum height 58b of each of convex optical elements 22b. Minimum thickness 124 of secondary optical layer 70 can also, in some embodiments, be larger than maximum height 58b. To illustrate, and without limitation, maximum thickness 86 and/or minimum thickness 124 of secondary optical layer 70 can be greater than or equal to 0.1 mm, such as, for example, greater than or equal to or between any two of 0.5 mm, 0.7 mm, 0.9 mm, 1.1 mm, 1.2 mm, 1.4 mm, or larger, e.g., greater than or equal to 0.6 mm. As a result, convex optical elements 22b can be fully encapsulated within a volume 90 defined between second secondary optical surface 74b and first film surface 46a. Secondary optical layer 70 can thereby protect convex optical elements 22b with little, if any, alterations to the optical design of the convex optical elements. While, as shown, optical article 10b comprises both primary and secondary optical layers 34 and 70, in other embodiments the optical article can omit the primary optical layer, e.g., such that convex optical elements 22b but not concave optical elements 22a are encapsulated.

Secondary optical layer 70 can comprise a second optical member 50b and a second adhesive 54b. Second adhesive 54b can have opposing first and second adhesive surfaces 78a and 78b, where the first adhesive surface defines first secondary optical surface 74a, e.g., such that the second adhesive is disposed on second film surface 46b. Second adhesive 54b can thereby couple and/or adhere second optical member 50b to film 38. To maintain the optical design of convex optical elements 22b, second adhesive 54b can have a thickness sufficient to fully encapsulate the optical elements. For example, maximum thickness 82 and/or minimum thickness 128 of second adhesive 54b, e.g., measured between first and second adhesive surfaces 78a and 78b in a direction perpendicular to first or second film surfaces 46a, 46b, can be greater than maximum height 58b of each of convex optical elements 22b. Each of convex optical elements 22b can thus be contained within a volume defined between second adhesive surface 78b and first film surface 46a.

The addition value of convex optical elements 22b and/or concave optical elements 22a can depend at least in part on the materials used in secondary optical layer 70, e.g., for second optical member 50b and second adhesive 54b, and/or in primary optical layer 34. Second optical member 50b can be, for example, a lens or a wafer, and can comprise any of the materials described above in reference to first optical member 50a. And, second adhesive 54b can comprise any optically suitable adhesive and/or one or more coatings, such as any of those described in reference to first adhesive 54a. To achieve a desired addition value for concave and convex optical elements 22a and 22b, first adhesive 54a and second adhesive 54b can have different indices of refraction, e.g., that differ by at least 0.10 such as, for example, greater than or equal to or between any two of 0.10, 0.15, 0.20, 0.25, 0.30, 0.35, 0.40, 0.45, 0.50, or more. First adhesive 54a can have an index of refraction that is greater than or less than that of second adhesive 54b, depending on, for example, whether a positive addition value, e.g., to control myopia, or a negative addition value, e.g., to control hyperopia, is desired. First and second optical members 50a and 50b can comprise the same material, e.g., can have the same index of refraction; however, in other embodiments, the first and second optical members can have different indices of refraction.

To form one of the present optical articles having a secondary optical layer, e.g., 70, some methods comprise coupling the film layer to the secondary optical layer. The secondary optical layer can have opposing first and second secondary optical surfaces, e.g., 74a and 74b, respectively, and the coupling can be performed such that the first secondary optical surface is disposed on the second film surfaces. The secondary optical surface can have a maximum and/or minimum thickness, e.g., 86 and 124, respectively, that is larger than the maximum height, e.g., 58b, of each of the convex optical elements such that the secondary optical surface fully encapsulates the convex optical elements, e.g., as described above in reference to optical article 10b.

The secondary optical member, in some methods, comprises a second adhesive, e.g., 54b, disposed on a second optical member, e.g., 50b, e.g., as in optical article 10b. In some of such methods, coupling the secondary optical layer can comprise applying the second adhesive to at least one of the second film surface and a surface of the second optical member. The second optical member can be adhered to the film layer with the second adhesive such that the second adhesive is disposed between the film layer and the second optical member and fully encapsulates the convex optical elements, e.g., as in optical article 10b. If the second adhesive comprises one or more coating(s), the coating(s) can be applied to the second film surface, e.g., to encapsulate the convex optical elements, and cured. After the curing, the second optical member can be formed and coupled to the cured coating(s) in a mold, e.g., as described in further detail below.

Figure 4A:
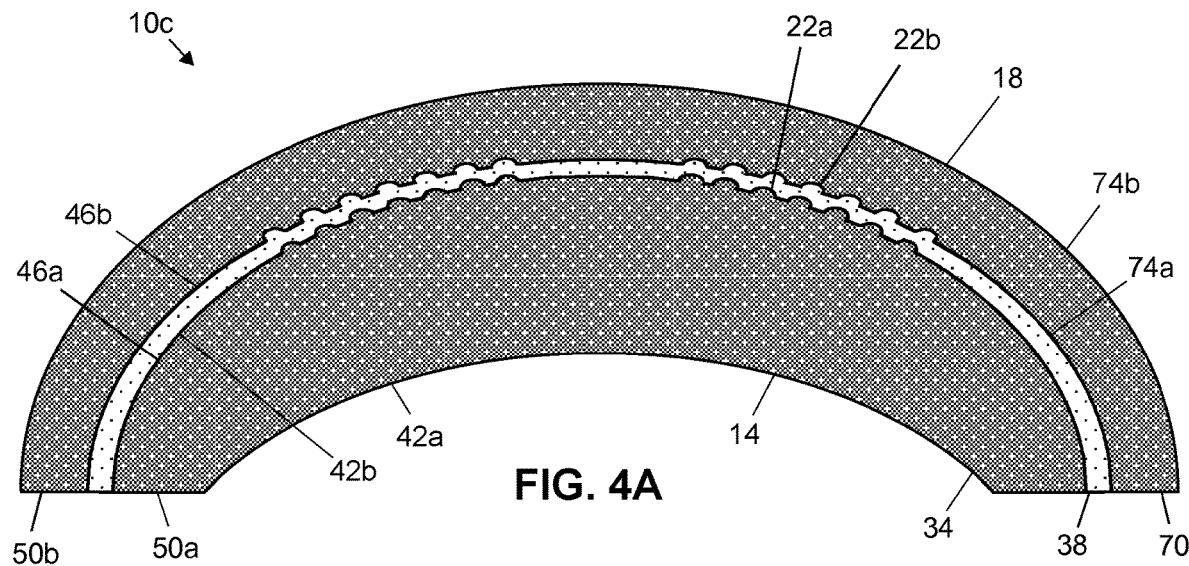
FIGS. 4A and 4B are sectional views of a third embodiment of the present optical articles having primary and secondary optical layers that are molded on the film layer.
Figure 4B:
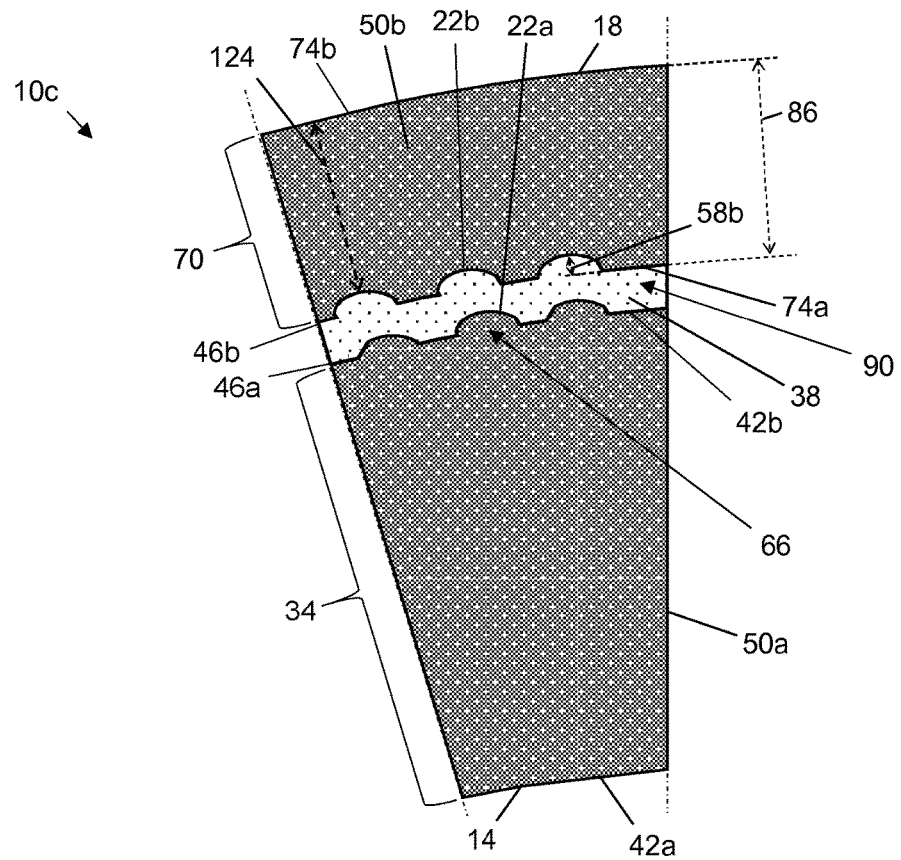

Referring to FIGS. 4A-4B, shown is an optical article 10c that is substantially similar to optical article 10b, the primary exception being that each of primary and secondary optical layers 34 and 70 of optical article 10c is coupled to film layer 38 without an adhesive, e.g., 54a or 54b. As shown, each of first and second optical members 50a and 50b can be disposed directly on first and second film surfaces 46a and 46b, respectively. First optical member 50a can encapsulate each of concave optical elements 22a, e.g., can occupy all of a volume 66 defined by each of the concave optical elements, and second optical member 50b can encapsulate each of convex optical elements 22b, e.g., can have a maximum and/or minimum thickness 86, 124 that is larger than maximum height 58b of each of the convex optical elements. As shown, each of first and second optical members 50a and 50b comprises a lens; in other embodiments, however, the first and second optical members can comprise any suitable optical member, such as a wafer.

To achieve a desired addition value for concave and convex optical elements 22a and 22b, first and second optical members 50a and 50b can comprise different materials such that the first and second optical members have different indices of refraction, e.g., that differ by at least 0.10 such as, for example, greater than or equal to or between any two of 0.10, 0.15, 0.20, 0.25, 0.30, 0.35, 0.40, 0.45, 0.50, or more. First optical member 50a can have an index of refraction that is greater than or less than the index of refraction of second optical member 50b, depending on, for example, whether a positive addition value, e.g., to control myopia, or a negative addition value, e.g., to control hyperopia, is desired.

First and second optical members 50a and 50b can be molded onto film layer 38. To form some of the present optical articles having molded optical member(s), e.g., 10c-10e, some methods comprise placing the film layer on one or more molds. Referring to FIGS. 5A-5D, shown is a first mold, e.g., 102, suitable for use in some of the present methods to form and couple at least a portion of, e.g., the optical member, of the primary and/or secondary optical layers. The first mold can comprise a first mold portion, e.g., 106a, that defines a first molding surface, e.g., 110a, e.g., via mold insert 114a, and a second mold portion, e.g., 106b, that defines a second molding surface, e.g., 110b, e.g., via mold insert 114b. Each of the molding surfaces can be concave, convex, or planar, depending on the desired article shape; for example, as shown, the first molding surface can be convex, e.g., to form a concave optical surface, and the second molding surface can be concave, e.g., to form a convex optical surface.

Figure 5A:
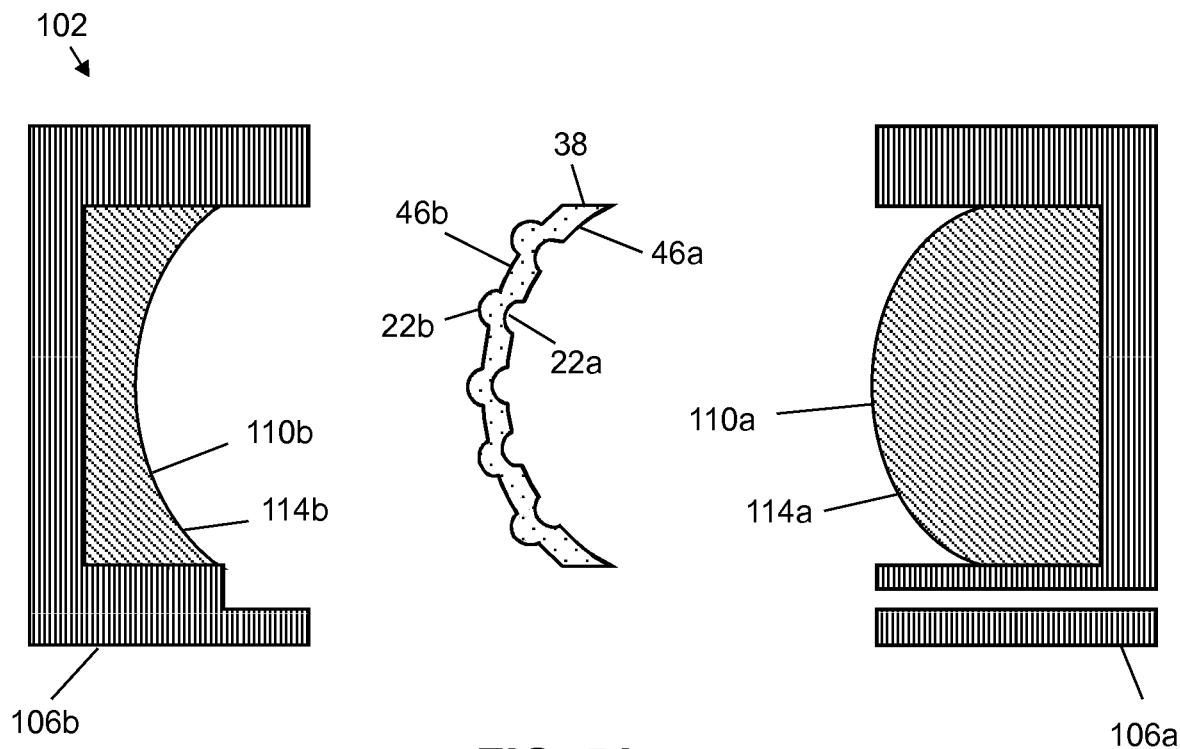
FIGS. 5A-5D schematically illustrate a first mold suitable for use in some of the present methods to manufacture the optical article of FIG. 4A.
Figure 5B:
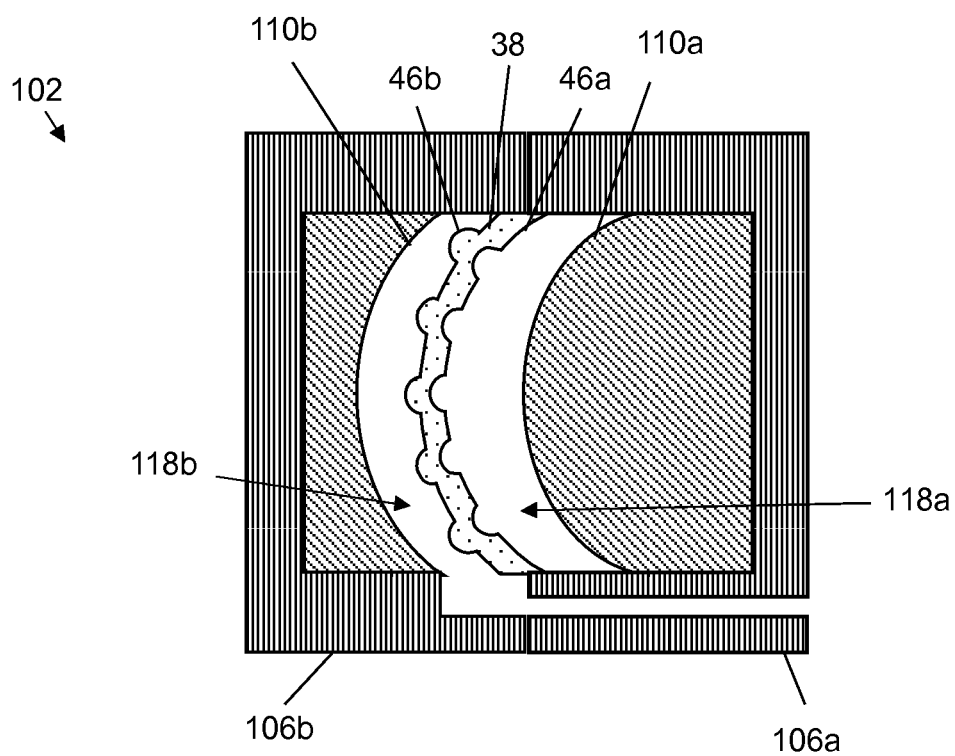
Figure 5C:
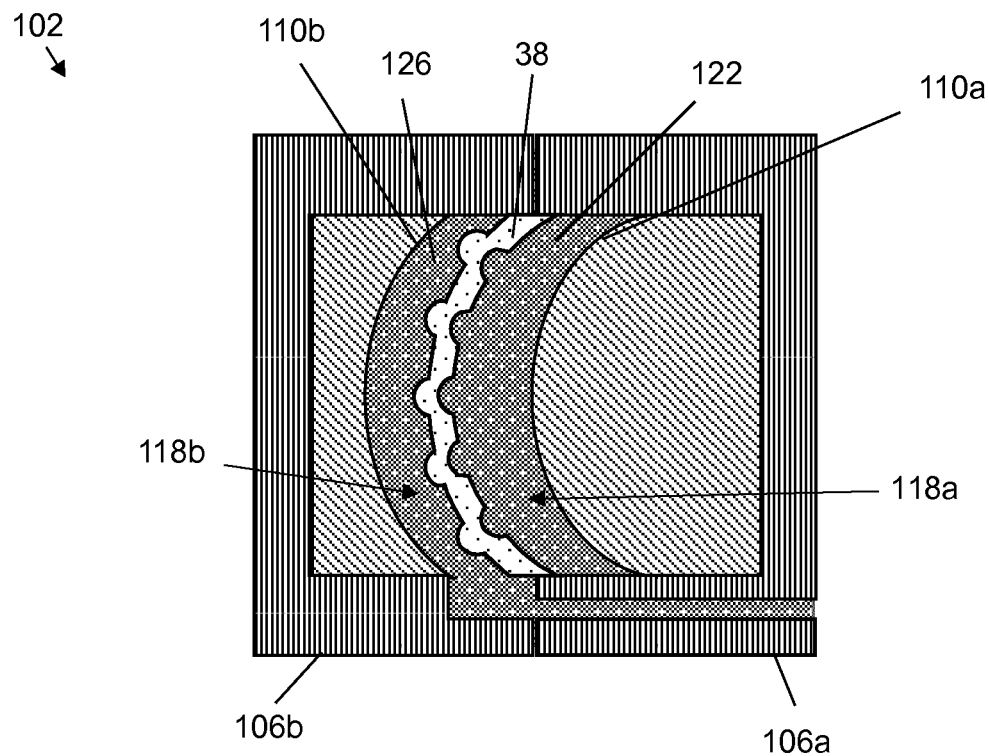
Figure 5D:
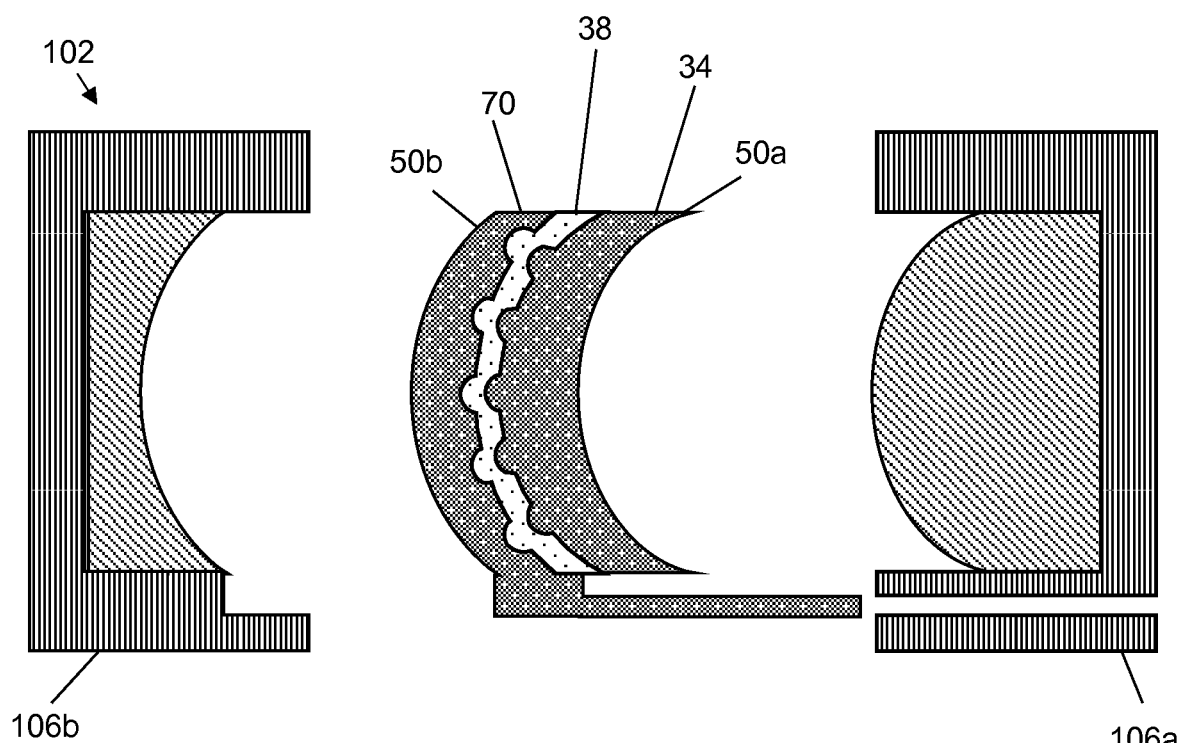

Some of the present methods comprise placing the film layer on the first mold and moving the first and second mold portions from an open position (FIG. 5A) to a closed position (FIG. 5B). As shown, a first volume, e.g., 118a, can be defined between the first film surface and the first molding surface and a second volume, e.g., 118b, can be defined between the second film surface and the second molding surface. To form the primary optical layer, e.g., the first optical member, some methods comprise introducing a first moldable material into the first volume such that, for each of the concave optical elements, the first moldable material occupies all of the volume defined by the concave optical element (FIG. 5C). The first moldable material can be set, e.g., by curing and/or cooling, to form the primary optical layer, e.g., the first optical member (FIG. 5D). Similarly, to form the secondary optical layer, e.g., the second optical member, some methods comprise introducing a second moldable material into the second volume (FIG. 5C) and setting the second moldable material, e.g., by curing and/or cooling, to form the secondary optical layer, e.g., the second optical member. The first and second moldable materials can have different indices of refraction. The molding can be performed by injection molding or casting.

While the above molding steps are described in reference to a single mold, e.g., 102, in some methods multiple molds can be used, e.g., to form the primary optical layer in a first mold and the secondary optical layer in a second mold. And, while as shown the molding is performed to form and couple the first and second optical members to the film layer, e.g., without adhesive, in some methods the first and/or second adhesives can be coupled to the film layer before the molding, e.g., in the form of cured coating(s), as described above, such that the first volume is defined between the first adhesive and the first molding surface and/or the second volume is defined between the second adhesive and the second molding surface. Optionally, molding can be performed to form only one, rather than both, of the primary and secondary optical layers.

Figure 6A:
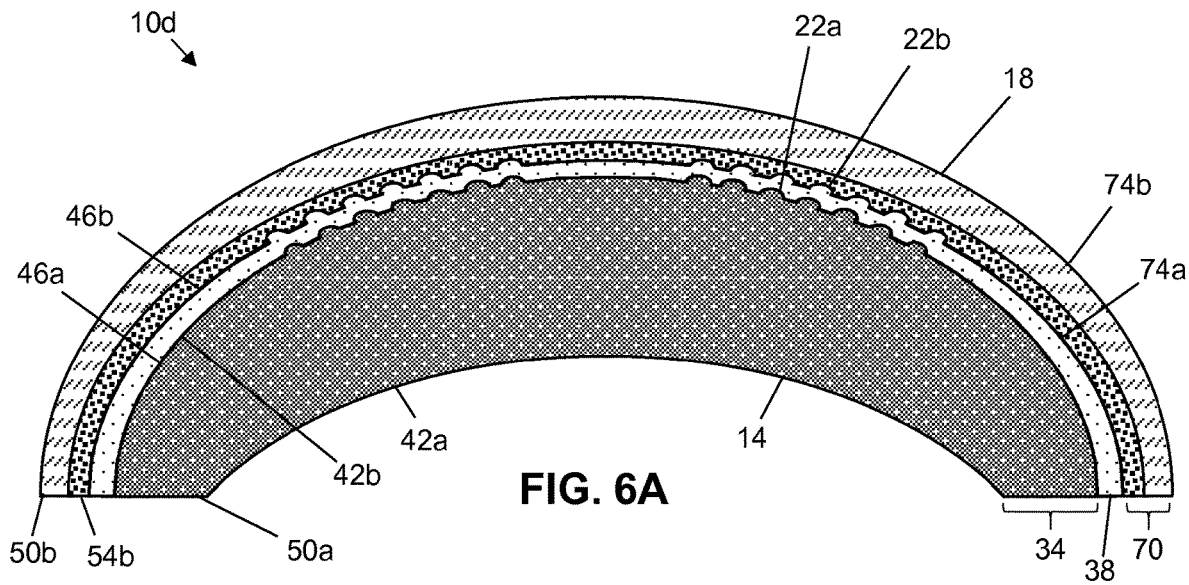
FIGS. 6A and 6B are sectional views of a fourth embodiment of the present optical articles having a primary optical layer coupled to the film layer without the use of an adhesive and a secondary optical layer coupled to the film layer with an adhesive.
Figure 6B:
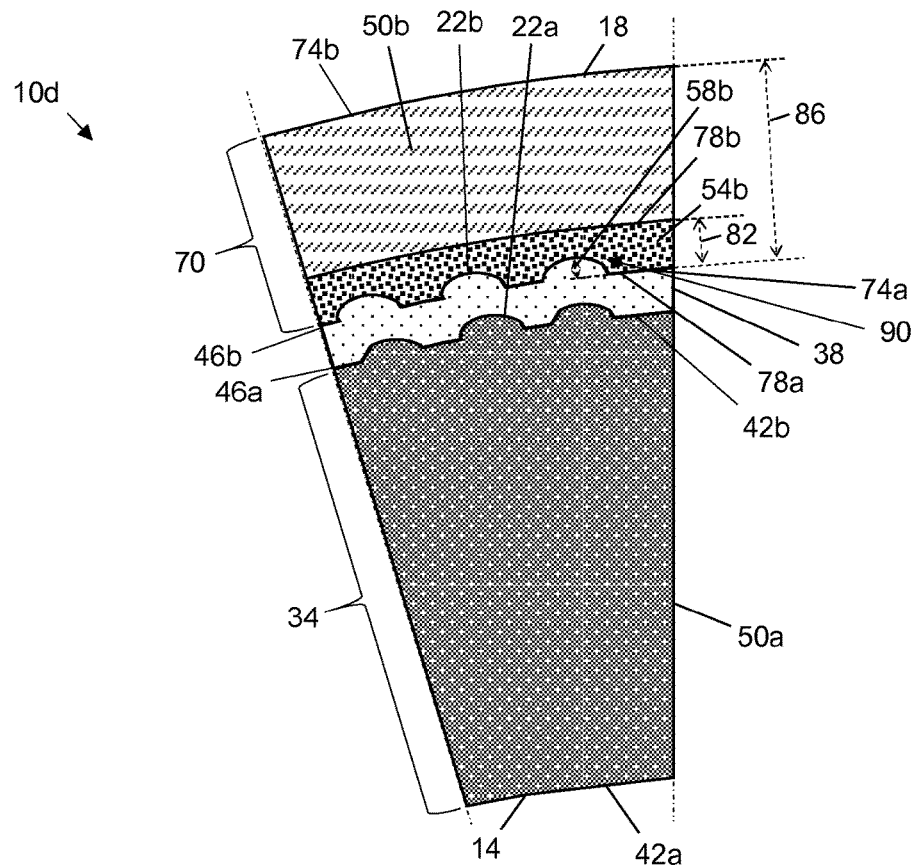
Figure 7A:
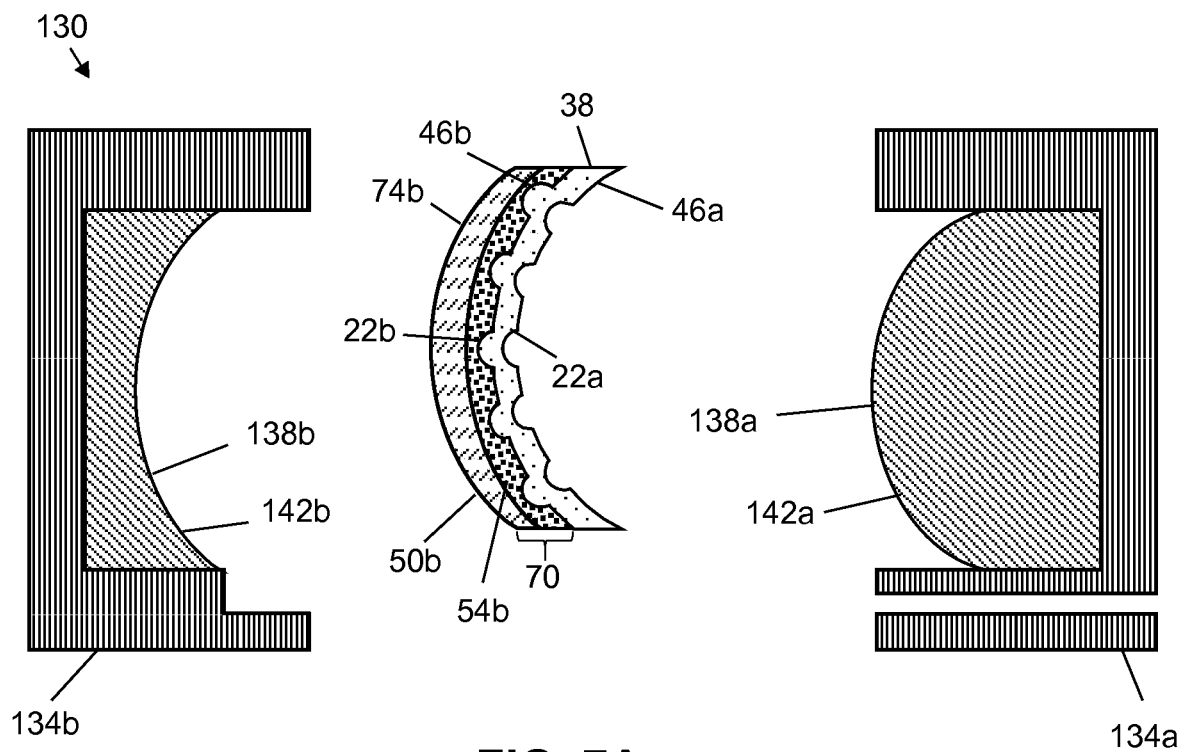
FIGS. 7A-7D schematically illustrate a second mold suitable for use in some of the present methods to manufacture the optical article of FIG. 6A.
Figure 7B:
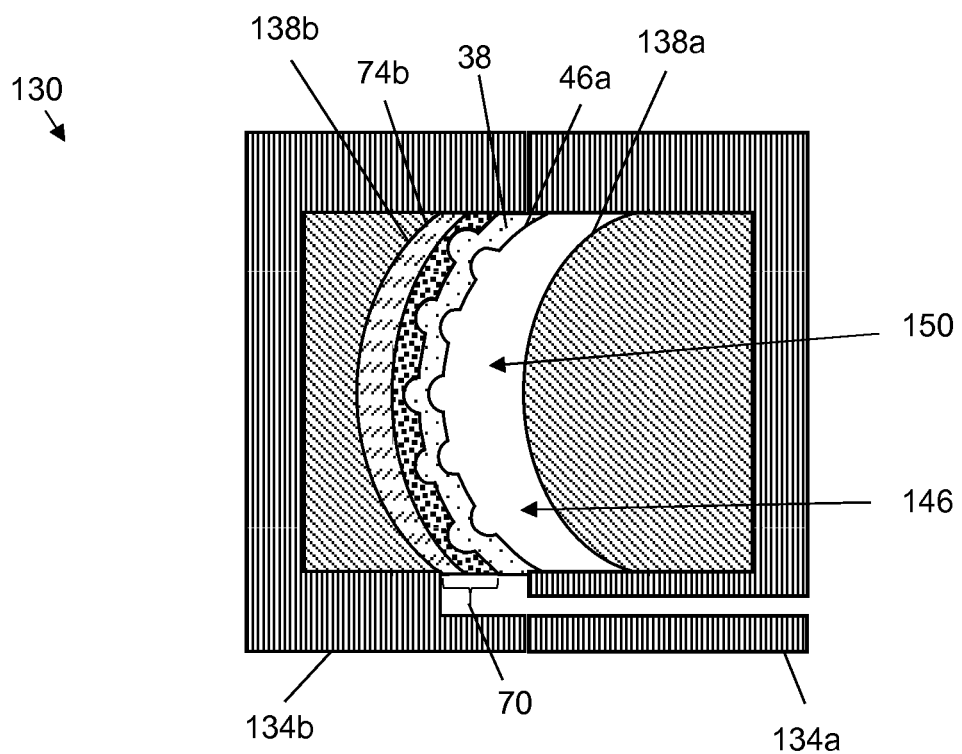
Figure 7C:
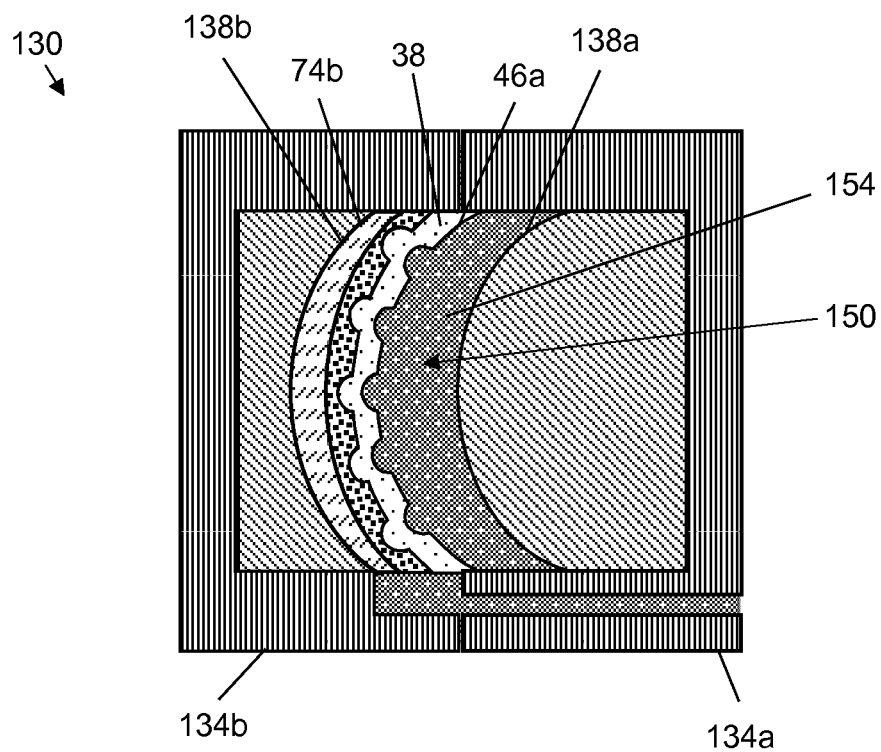
Figure 7D:
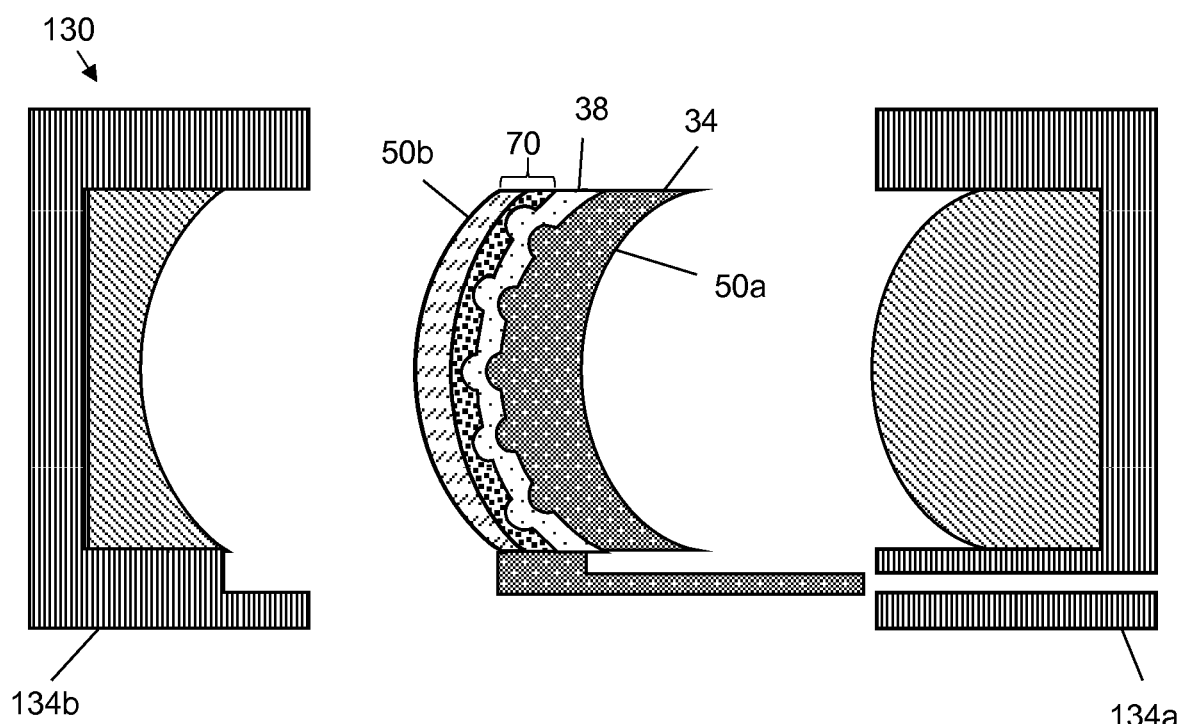

Some of the present optical articles comprise an optical layer coupled to the film layer via an adhesive and an optical layer coupled to the film layer without adhesive, e.g., is molded onto the film layer. Referring to FIGS. 6A and 6B, shown is an optical article 10d that is substantially similar to optical article 10b, the primary exception being that primary optical layer 34 of optical article 10d does not comprise first adhesive 54a, e.g., such that first optical member 50a is molded directly onto film layer 38 as described above in reference to optical article 10c. And, second optical member 50b, as shown, can comprise a wafer; in other embodiments, however, the second optical member can comprise a lens. As in optical article 10c, second optical members 50a and 50b of optical article 10d can have different indices of refraction.

Referring to FIGS. 7A-7D, shown is a second mold, e.g., 130, suitable for use in some of the present methods to form an optical article, e.g., 10d and 10e, that has both an adhesively coupled optical layer and a molded optical layer. The second mold can have first and second mold portions, e.g., 134a and 134b, each defining a molding surface, e.g., 138a and 138b, respectively, e.g., via mold inserts 142a and 142b. Each of the molding surfaces can be concave, convex, or planar, depending on the desired article shape; for example, as shown, the molding surface of the first mold portion can be convex, e.g., to form a concave optical surface, and the molding surface of the second mold portion can be concave, e.g., to receive the second secondary optical surface.

In some methods, the secondary optical layer can comprise the second adhesive, which can be used to adhere the second optical member to the second film surface, e.g., as described above in reference to optical article 10b, before the molding. Some methods comprise placing the film layer and the second optical layer on the second mold such that the second secondary optical surface is disposed on the molding surface of the second mold portion. After the placing, the first and second mold portions can be moved from an open position (FIG. 7A) to a closed position (FIG. 7B) in which the mold portions cooperate to define a mold cavity, e.g., 146, that is larger than the film layer and the second optical layer such that a volume, e.g., 150, is defined between the first film surface and the molding surface of the first mold portion. To form and couple the primary optical layer, e.g., the first optical member, to the film layer, the first moldable material can be introduced into the volume (FIG. 7C) such that the first moldable material occupies all of the volume defined by each of the optical elements. The first moldable material can be set, e.g., by curing and/or cooling, to form the primary optical layer, e.g., the first optical member. The molding can be performed by, for example, injection molding or casting. In some methods, a similar process can be performed to form and couple the secondary optical layer, e.g., the second optical member, to the film layer if the first optical layer is adhesively coupled to the film layer.

Figure 8A:
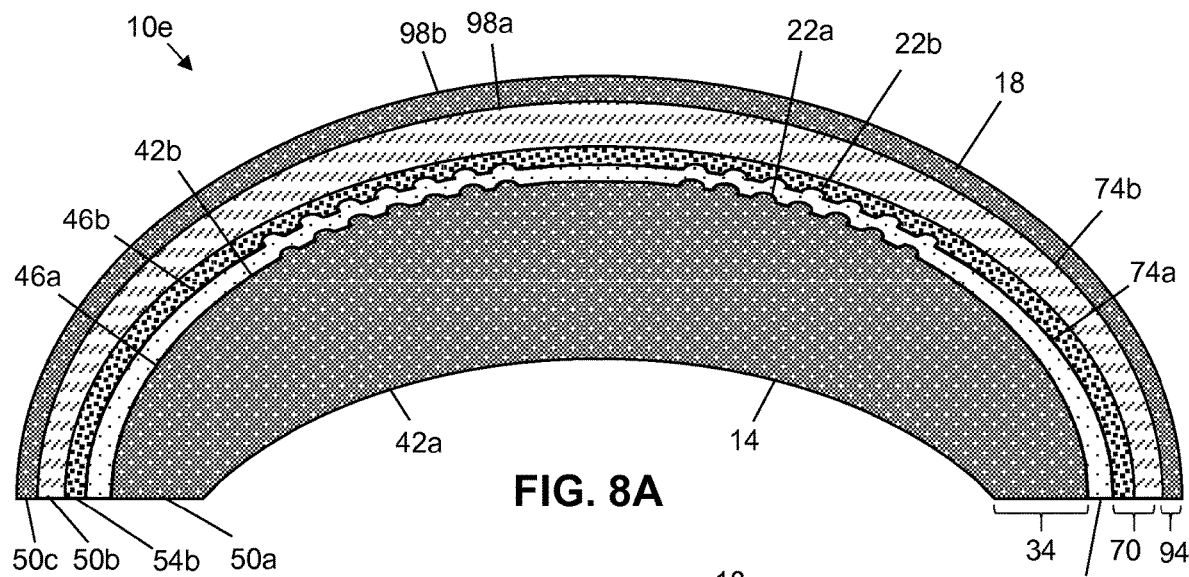
FIGS. 8A and 8B are sectional views of a fifth embodiment of the present optical articles that has a tertiary optical layer coupled to the secondary optical layer.
Figure 8B:
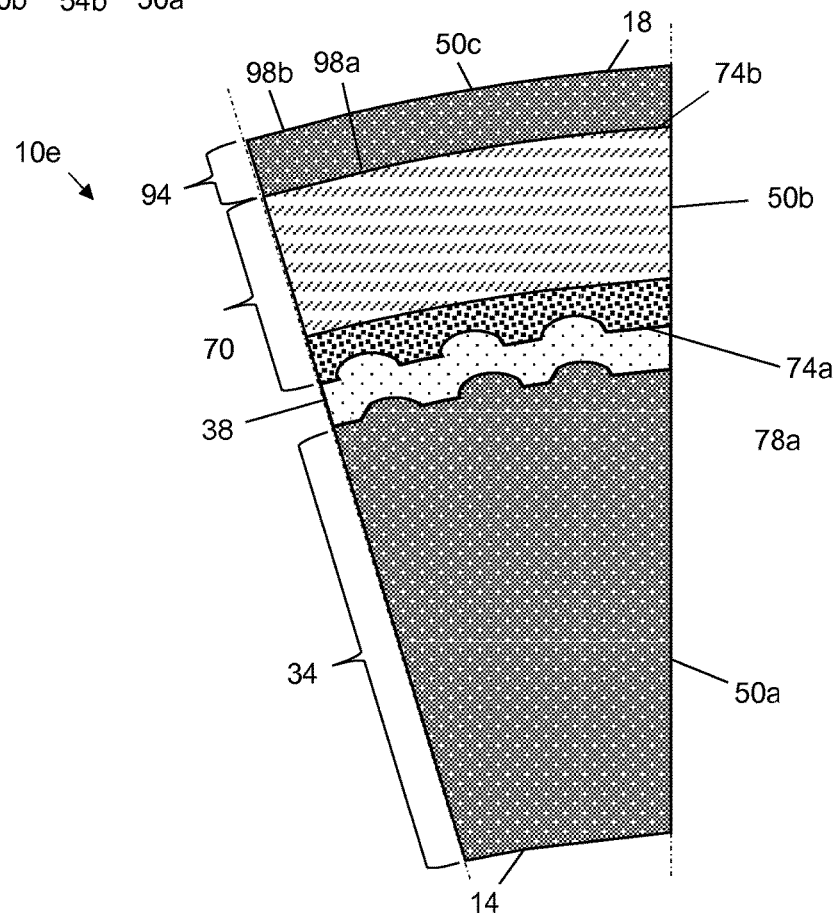

Referring to FIGS. 8A and 8B, shown is an optical article 10e that is substantially similar to optical article 10d, the primary exception being that optical article 10e also comprises a tertiary optical layer 94 coupled to secondary optical layer 70. Tertiary optical layer 94 can have first and second tertiary optical surfaces 98a and 98b and, as shown, can be coupled such that the first tertiary optical surface is disposed on second secondary optical surface 74b, e.g., on second optical member 50b. Tertiary optical layer 94 can comprise a third optical member 50c, optionally without a third adhesive, e.g., such that the third optical member is disposed directly on second optical member 50b. Third optical member 50c can comprise any suitable optical material, such as any of those used for first and second optical members 50a and 50b. To achieve a desired addition value for optical elements 22a and 22b, third optical member 50c can comprise a material that has an index of refraction that is different than that of the material of second optical member 50b and, optionally, is the same as that of the material of first optical member 50a. For example, first and third optical members 50a and 50c can each comprise a lens. Using multiple lenses can, for example, provide added protection for optical elements 22a and 22b and, if first and/or second optical members 50a and 50c are polarized, provide appropriate polarization for optical article 10e.

While tertiary optical layer 94, as shown, can define outer surface 18 of optical article 10e, in other embodiments the tertiary optical layer can define inner surface 14. For example, in other embodiments, primary optical layer 34 can comprise first adhesive 54a to couple first optical member 50a to film layer 38, e.g., as in optical article 10a, second optical member 50b can be coupled to the film layer without adhesive, e.g., as in optical article 10c, and tertiary optical member 94, and thus, e.g., third optical member 50c, can be disposed on first primary optical surface 42a. In such a configuration, second and third optical members 50b and 50c can have the same index of refraction that is different from the index of refraction of first optical member 50a.

A tertiary optical layer, e.g., 94, can be incorporated into one of the present optical articles, e.g., 10e, by molding or via a third adhesive. Referring to FIGS. 9A-9D, shown is a third mold, e.g., 158, suitable for use in some of the present methods to form and couple the tertiary optical layer to the primary or secondary optical layers. The third mold can comprise first and second mold portions, e.g., 162a and 162b, each defining a molding surface, e.g., 166a and 166b, respectively, e.g., via mold inserts 170a, 170b. Each of the molding surfaces can be concave, convex, or planar, depending on the desired article shape; for example, as shown, the molding surface of the first mold portion can be convex, e.g., to form a concave optical surface, and the molding surface of the second mold portion can be concave, e.g., to form a convex optical surface.

Figure 9A:
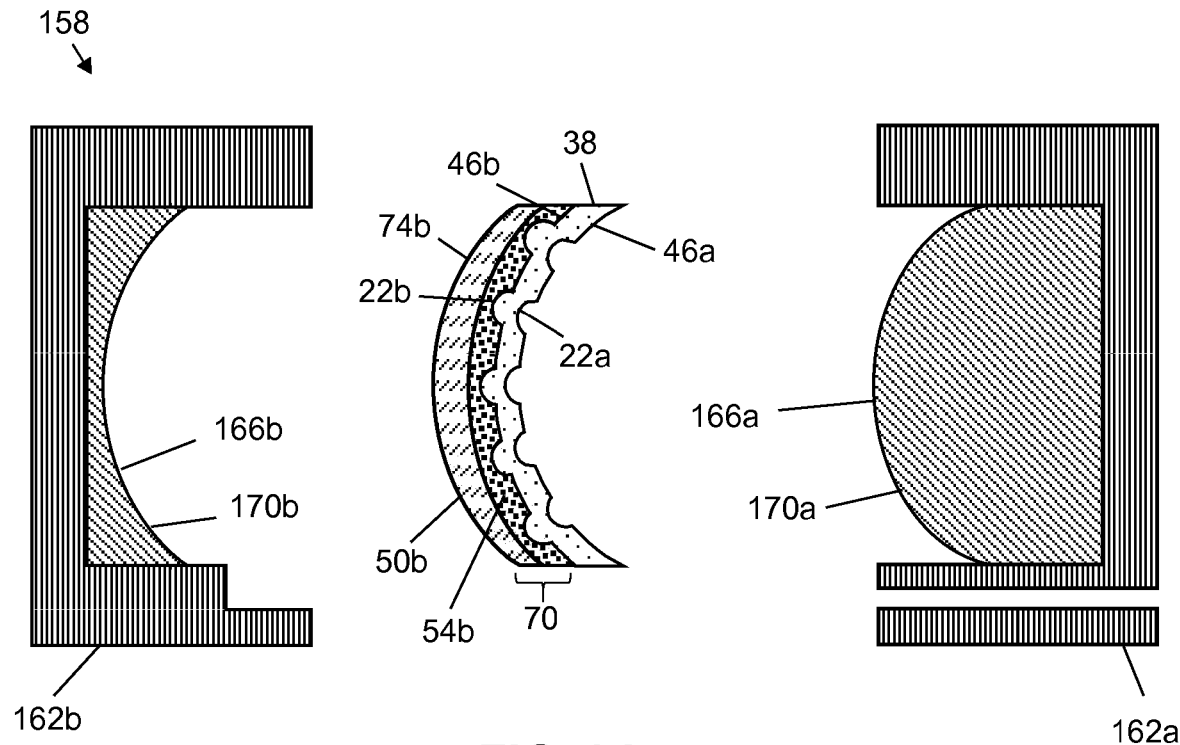
FIGS. 9A-9D schematically illustrate a third mold suitable for use in some of the present methods to manufacture the optical article of FIG. 8A.
Figure 9B:
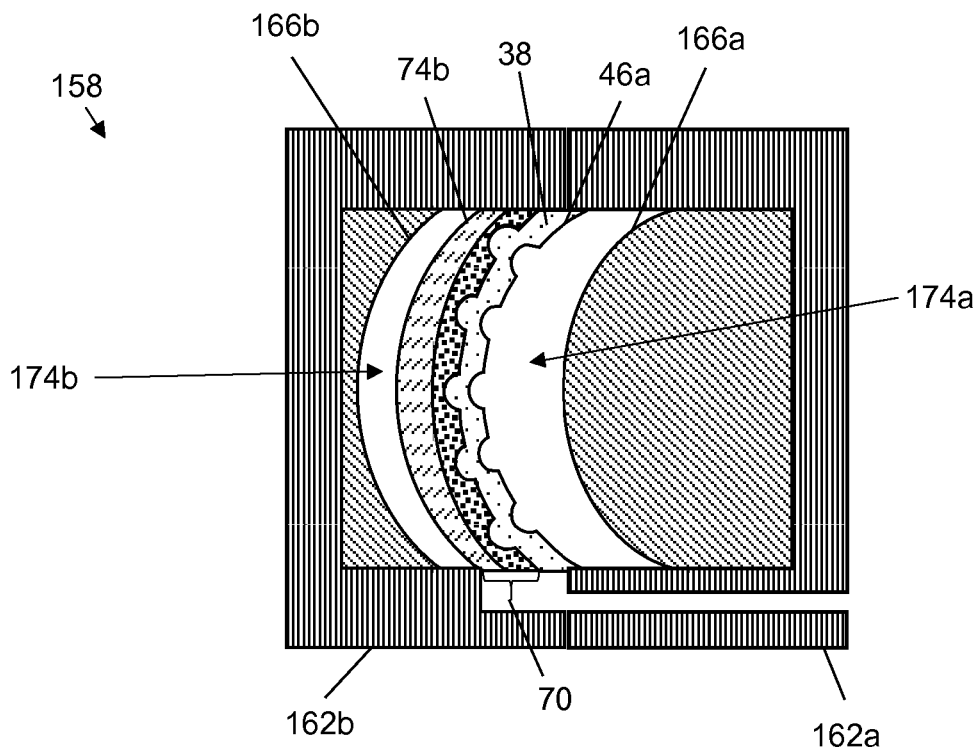
Figure 9C:
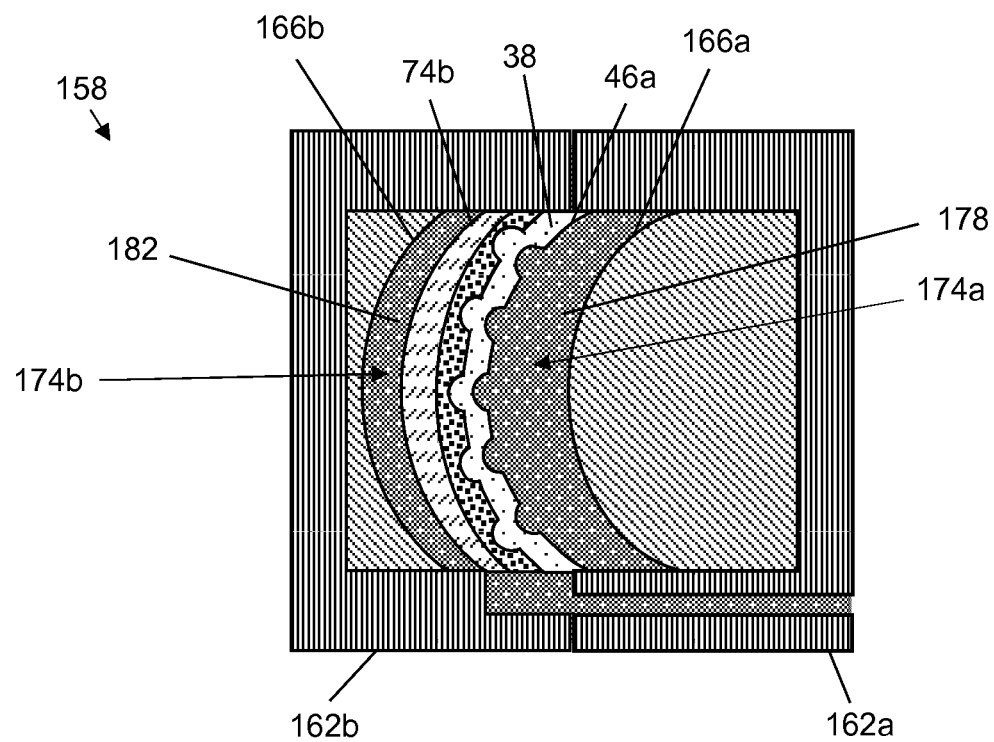
Figure 9D:
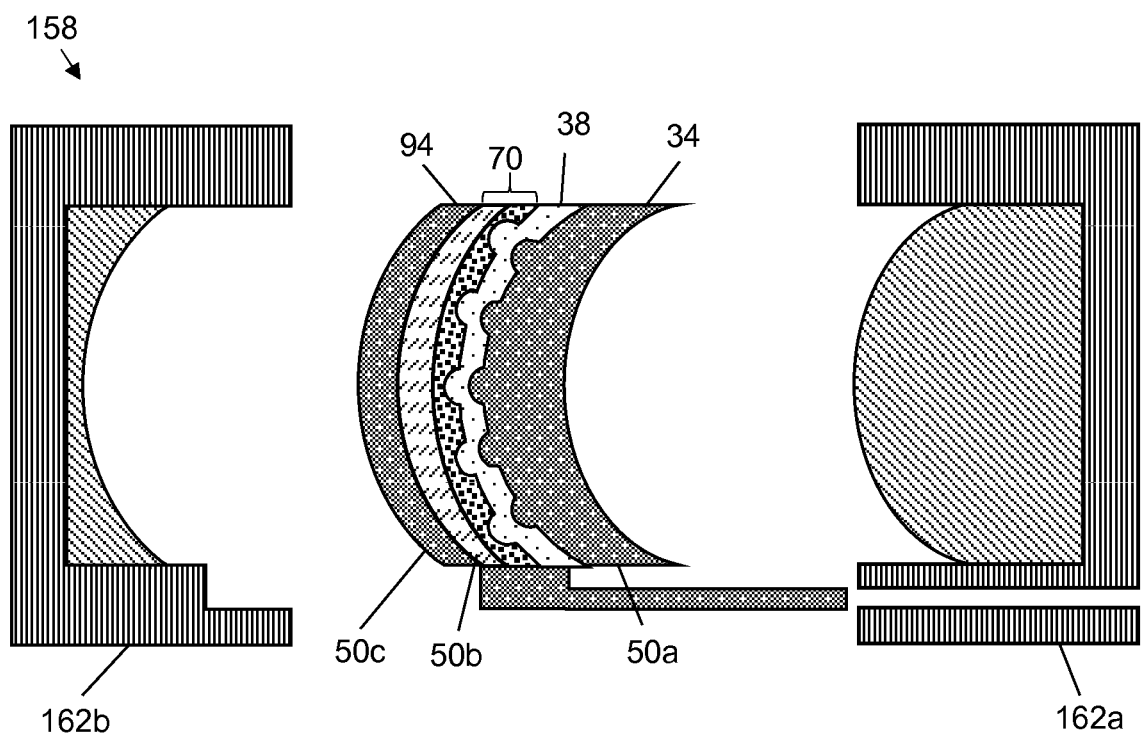

As with the process described in reference to FIGS. 7A-7D, the second optical member can be coupled to the film layer via the second adhesive before the molding, and subsequently placed on the third mold. The mold portions can be moved from an open position (FIG. 9A) to a closed position (FIG. 9B) such that a first volume, e.g., 174a, is defined between the first film surface and the molding surface of the first mold portion, and a second volume, e.g., 174b, is defined between the second secondary optical surface and the molding surface of the second mold portion. A first moldable material, e.g., 178, can be introduced into the first volume and a second moldable material, e.g., 182, can be introduced into the second volume (FIG. 9C). The first and second moldable materials can be set, e.g., by curing and/or cooling, to form the primary optical layer, e.g., the first optical member, and the tertiary optical layer, e.g., the third optical member, respectively. The first and second moldable materials can be the same, e.g., to provide the same index of refraction. The molding can be performed by, for example, injection molding or casting. In other embodiments, a similar molding process can be performed to form and couple the second and third optical members to the film layer if the first optical member is adhesively coupled to the film layer. While the above molding process is described with reference to a single mold, e.g., 158, in other methods the molding process can be performed with multiple molds, e.g., to form the primary optical layer in a first mold and the tertiary optical layer in a second mold.

Figure 10:
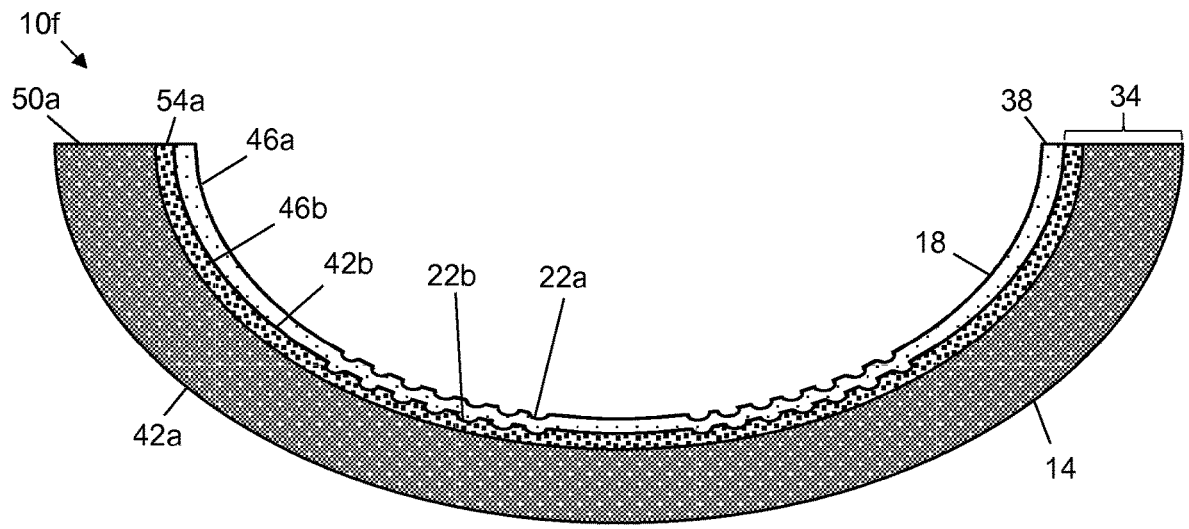
FIG. 10 is a sectional view of a sixth embodiment of the present optical articles where the convex optical elements, but not the concave optical elements, are encapsulated.
Figure 11:
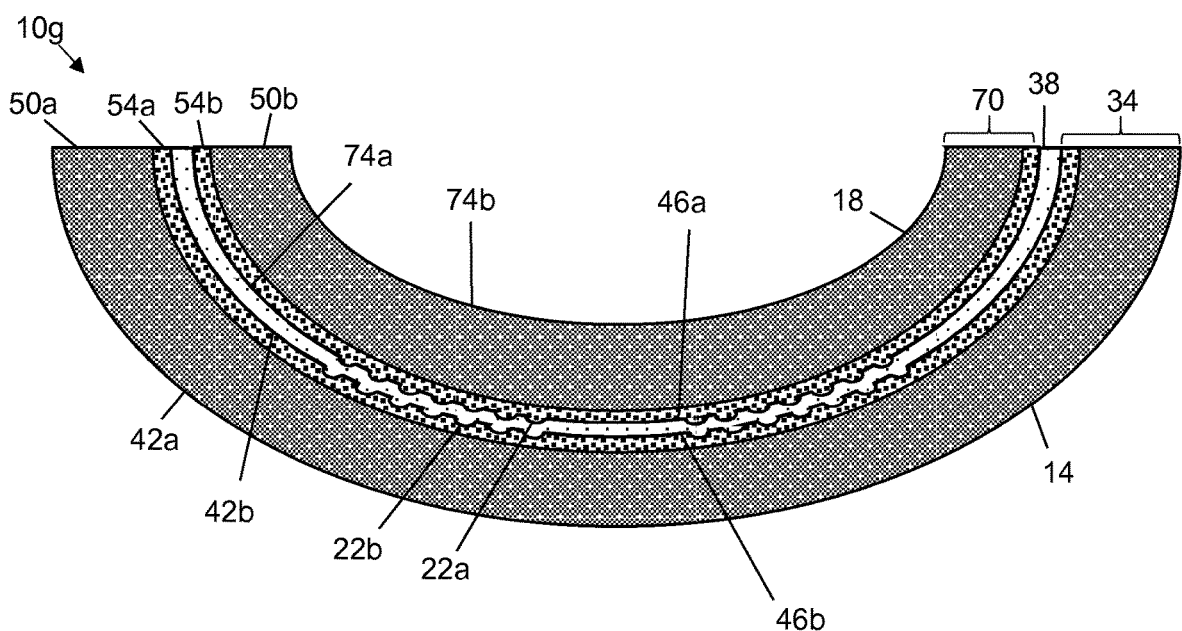
FIG. 11 is a sectional view of a seventh embodiment of the present optical articles where the outer surface of the article is concave.

While each of optical articles 10a-10e, as shown, comprises encapsulated concave optical elements 22a that are disposed closer to inner surface 14 than are convex optical elements 22b, other embodiments can comprise concave optical elements that are not encapsulated and/or that are disposed closer to, e.g., face, the outer surface of the optical article than are the convex optical elements. For example, referring to FIG. 10, optical article 10f can be substantially similar to optical article 10a, the primary exception being that second primary optical surface 42b of primary optical layer 34 is disposed on second film surface 46b rather than first film surface 46a, e.g., to encapsulate convex optical elements 22b. Concave optical elements 22a thus need not be encapsulated but can, for example, be coated. Additionally, or alternatively, first film surface 46a can define outer surface 18 of optical article 10f, where, optionally, inner surface 14 is convex and outer surface 18 is concave. Such an arrangement can be suitable, for example, for controlling hyperopia. Referring to FIG. 11, optical article 10g can be substantially similar to optical article 10f, the primary exception being that secondary optical layer 70 is disposed on first film surface 46a. And, while optical articles 10a-10g comprise a film layer 38 having concave optical elements 22a defined on a first film surface 46a and convex optical elements 22b defined on a second film surface 46b, in some embodiments each of the first and second film surfaces can comprise both concave and convex optical elements, e.g., for control of astigmatism. In some embodiments, film layer 38 is embossed such that only one of first and second film surfaces 46a and 46b defines optical elements.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An optical article comprising:
a film layer having opposing first and second film surfaces, wherein the film layer is embossed such that:
the second film surface defines a plurality of convex optical elements;
the first film surface defines a plurality of concave optical elements; and
each of the convex and concave optical elements has a diameter that is less than or equal to 2.0 millimeters (mm) and a maximum height, measured in a direction perpendicular to the first film surface, that is less than or equal to 0.1 mm; and
a primary optical layer that has opposing first and second primary optical surfaces and is coupled to the film, wherein:
the second primary optical surface is disposed on the second film surface and the primary optical layer has a maximum thickness, measured in a direction perpendicular to the second film surface between the first and second primary optical surfaces, that is larger than the maximum height of each of the convex optical elements such that the convex optical elements are encapsulated within a volume defined between the first film surface and the first primary optical surface;
wherein the optical article is adapted to correct refractive errors of an eye.

2. The optical article of claim 1, comprising a secondary optical layer having:
opposing first and second secondary optical surfaces, wherein the first secondary optical surface is disposed on the first film surface such that, for each of the concave optical elements, the secondary optical layer occupies all of a volume defined by the concave optical element.

3. The optical article of claim 2, wherein the secondary optical layer comprises a first adhesive disposed on a first optical member such that the first adhesive:
defines the first secondary optical surface;
couples the first optical member to the film layer; and
for each of the concave optical elements, occupies all of the volume defined by the concave optical element.

4. The optical article of claim 2, wherein the primary optical layer comprises a first optical member defining the first secondary optical surface such that, for each of the concave optical elements, the first optical member occupies all of the volume defined by the concave optical element.

5. The optical article of claim 2, wherein the primary optical layer comprises a second adhesive disposed on a second optical member such that the second adhesive:
has opposing first and second adhesive surfaces, wherein the first adhesive surface defines the second primary optical surface and the second adhesive surface is disposed on the second optical member;
couples the second optical member to the film layer; and
has a maximum thickness, measured in a direction perpendicular to the second film surface between the first and second adhesive surfaces, that is larger than the maximum height of each of the convex optical elements such that the convex optical elements are encapsulated within a volume defined between the second adhesive surface and the first film surface;
wherein, optionally, the secondary optical layer comprises the first adhesive disposed on the first optical member and the first adhesive has a first index of refraction and the second adhesive has a second index of refraction different from the first index of refraction.

6. The optical article of claim 2, wherein the secondary optical layer comprises a second optical member that defines the first and second secondary optical surfaces such that the second optical member encapsulates the convex optical elements.

7. The optical article of claim 5, comprising a third optical member, wherein:
the secondary optical layer comprises the first adhesive disposed on the first optical member, the secondary optical layer comprises the second optical member defining the first and second secondary optical surfaces, and the third optical member is disposed on the second secondary optical surface, wherein the first optical member has a first index of refraction and the second and third optical members each have a second index of refraction different from the first index of refraction; or the secondary optical layer comprises the first optical member defining the first secondary optical surface, the secondary optical layer comprises the second adhesive disposed on the second optical member, and the third optical member is disposed on the first primary optical surface, wherein the first and third optical members each have a first index of refraction and the second optical member has a second index of refraction different from the first index of refraction.

8. A method of forming an optical article adapted to correct refractive errors of an eye, the method comprising:
embossing a film having opposing first and second surfaces such that:
the second surface defines a plurality of convex optical elements;
the first surface defines a plurality of concave optical elements; and
each of the convex and concave optical elements has a diameter that is less than or equal to 2.0 millimeters (mm) and a maximum height, measured in a direction perpendicular to the first surface, that is less than or equal to 0.1 mm;
cutting the film to separate one or more film layers, each having opposing first and second film surfaces, the second film surface having a plurality of the convex optical elements and the first film surface having a plurality of the concave optical elements; and
for each of the film layer(s), coupling the film layer to a primary optical layer having opposing first and second primary optical surfaces such that the second primary optical surface is disposed on the second film surface, wherein the primary optical layer has a maximum thickness, measured in a direction perpendicular to the second film surface between the first and second primary optical surfaces, that is larger than the maximum height of each of the convex optical elements such that the convex optical elements are encapsulated within a volume defined between the first primary optical surface and the second film surface.

9. The method of claim 8, comprising, for each of the film layer(s), coupling the film layer to a secondary optical layer having opposing first and second secondary optical surfaces such that the first secondary optical surface is disposed on the first film surface and, for each of the concave optical elements, the secondary optical layer occupies all of a volume defined by the concave optical element.

10. The method of claim 8, wherein:
the secondary optical layer comprises a first adhesive disposed on a first optical member; and
coupling the secondary optical layer comprises:
applying the first adhesive to at least one of the first film surface and a surface of the first optical member; and
adhering the first optical member to the film layer such that the first adhesive is disposed between the first film surface and the first optical member and, for each of the concave optical elements, occupies all of the volume defined by the concave optical element.

11. The method of claim 9, wherein:
the primary optical layer comprises a second adhesive disposed on a second optical member; and
coupling the primary optical layer comprises:
applying the second adhesive to at least one of the second film surface and a surface of the second optical member; and
adhering the second optical member to the film layer such that the second adhesive is disposed between the second film surface and the second optical member;
wherein the applying is such that the second adhesive has a maximum thickness, measured in a direction perpendicular to the second film surface between the first and second adhesive surfaces, that is larger than the maximum height of each of the convex optical elements such that the convex optical elements are encapsulated within a volume defined between the second adhesive surface and the first film surface.

12. The method of claim 11, wherein coupling the secondary optical layer comprises:
placing the film layer and the primary optical layer on a mold comprising first and second mold portions such that the first primary optical surface is disposed on a molding surface of the second mold portion;
after the placing, moving the first and second mold portions from an open position to a closed position in which the mold portions cooperate to define a mold cavity that is larger than the film layer and the primary optical layer such that a volume is defined between the first film surface and a molding surface of the first mold portion; and
introducing a moldable material into the volume such that, for each of the concave optical elements, the moldable material occupies all of the volume defined by the concave optical element; and
setting the moldable material to form the primary optical layer.

13. The method of claim 9, wherein coupling the primary and secondary optical layers comprises, in one or more molds:
introducing a first moldable material into a first volume defined between the first film surface and a first molding surface of one of the mold(s) such that, for each of the concave optical elements, the first moldable material occupies all of the volume defined by the concave optical element;
introducing a second moldable material into a second volume defined between the second film surface and a second molding surface of one of the mold(s);
setting the first moldable material to form the secondary optical layer; and
setting the second moldable material to form the primary optical layer;
wherein the first moldable material has a first index of refraction and the second moldable material has a second index of refraction different from the first index of refraction.

14. The method of claim 10, wherein at least one of:
if the secondary optical layer comprises the first adhesive:
the first adhesive comprises a coating that includes one or more coating layers, at least one of the coating layer(s) comprising a scratch-resistant coating or an antireflective coating; and
applying the first adhesive comprises depositing the coating on the first film surface; and
if the secondary optical layer comprises the second adhesive:
the second adhesive comprises a coating that includes one or more coating layers, at least one of the coating layer(s) comprising a scratch-resistance coating or an antireflective coating; and applying the second adhesive comprises depositing the coating on the second film surface.

\* \* \* \* \*

UNITED STATES PATENT AND TRADEMARK OFFICE
CERTIFICATE OF CORRECTION

PATENT NO. : 12,257,792 B2
APPLICATION NO. : 17/286244
DATED : March 25, 2025
INVENTOR(S) : Matthieu Guillot et al.

Page 1 of 1

It is certified that error appears in the above-identified patent and that said Letters Patent is hereby corrected as shown below:

In the Claims

Claim 4, Column 14, Line 29, please delete "primary" and insert --secondary--.

Claim 7, Column 14, Line 62, please delete "secondary" and insert --primary--.

Claim 7, Column 14, Line 64, please delete "secondary" and insert --primary--.

Claim 14, Column 16, Line 62, please delete "secondary" and insert --primary--.

Signed and Sealed this
First Day of July, 2025

Coke Morgan Stewart
*Acting Director of the United States Patent and Trademark Office*